(12) United States Patent
Takiguchi

(10) Patent No.: US 8,272,815 B2
(45) Date of Patent: Sep. 25, 2012

(54) BORING TOOL AND METHOD OF BORING PILOT HOLE

(75) Inventor: Shoji Takiguchi, Anpachi-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 1212 days.

(21) Appl. No.: 12/088,886

(22) PCT Filed: Apr. 20, 2006

(86) PCT No.: PCT/JP2006/308310
§ 371 (c)(1),
(2), (4) Date: Apr. 1, 2008

(87) PCT Pub. No.: WO2007/039949
PCT Pub. Date: Apr. 12, 2007

(65) Prior Publication Data
US 2009/0136305 A1  May 28, 2009

(30) Foreign Application Priority Data

Oct. 3, 2005  (JP) .................. 2005-289710
Oct. 3, 2005  (JP) .................. 2005-289711
Oct. 5, 2005  (JP) .................. 2005-292102

(51) Int. Cl.
*B23B 27/18* (2006.01)
(52) U.S. Cl. ........................................ 408/144
(58) Field of Classification Search ............... 408/144; B23B 27/18
See application file for complete search history.

(56) References Cited

U.S. PATENT DOCUMENTS

| 4,688,652 | A | * | 8/1987 | Crist ........................... 175/420.1 |
| 4,971,485 | A | * | 11/1990 | Nomura et al. ............... 408/144 |
| 5,186,739 | A | * | 2/1993 | Isobe et al. ...................... 75/238 |
| 5,228,812 | A | * | 7/1993 | Noguchi et al. ............... 408/144 |
| 5,466,642 | A | * | 11/1995 | Tajima et al. ................. 501/96.4 |
| 7,241,085 | B2 | * | 7/2007 | Frisendahl .................... 408/144 |

(Continued)

FOREIGN PATENT DOCUMENTS

DE       19728157 A1    1/1999

(Continued)

OTHER PUBLICATIONS

"Hardness", www.allaboutcementedcarbide.com/01_03.html, Sandvik Hard Materials, 2008.*

(Continued)

*Primary Examiner* — Eric A Gates
(74) *Attorney, Agent, or Firm* — Leason Ellis LLP

(57) ABSTRACT

A boring tool can form a hole accurately by improving the rigidity of a reamer so that the runout of the reamer can be prevented at high speeds, extending product life by suppressing the breakage caused by cutting resistance. The boring tool is inserted into a pilot hole formed in a workpiece beforehand to cut the inner wall of the pilot hole. The boring tool comprises a shank part rotated about an axis, an edge part with a cutting edge at the tip of the shank part, and a chip discharging groove formed in the outer peripheral part of the edge part and extending from the tip to the rear end. The cutting edge is formed at a crossed ridge part between the wall surface of the chip discharging groove and the outer peripheral surface of the edge part. The cross-section of the chip discharging groove is formed in a U-shape.

3 Claims, 15 Drawing Sheets

U.S. PATENT DOCUMENTS

| | | | |
|---|---|---|---|
| 7,393,163 B2 * | 7/2008 | Edvardsson et al. | 408/230 |
| 7,901,163 B2 * | 3/2011 | Nomura | 408/59 |
| 2002/0057951 A1 * | 5/2002 | Silver | 408/1 R |
| 2003/0002932 A1 * | 1/2003 | Eriksson | 408/1 R |
| 2005/0169721 A1 | 8/2005 | Schulte | |
| 2010/0278603 A1 * | 11/2010 | Fang et al. | 408/144 |
| 2010/0290849 A1 * | 11/2010 | Mirchandani | 408/144 |
| 2010/0303566 A1 * | 12/2010 | Fang et al. | 407/119 |

FOREIGN PATENT DOCUMENTS

| | | |
|---|---|---|
| EP | 568515 A1 * | 11/1993 |
| JP | 51-008587 A | 1/1976 |
| JP | A-54-104093 | 8/1979 |
| JP | 61-39319 U | 3/1986 |
| JP | 62218010 A * | 9/1987 |
| JP | 63-093519 A | 4/1988 |
| JP | 64-052043 A | 2/1989 |
| JP | 2-100714 U | 8/1990 |
| JP | 2-269515 A | 11/1990 |
| JP | 03073209 A * | 3/1991 |
| JP | 03073210 A * | 3/1991 |
| JP | 03142201 A * | 6/1991 |
| JP | 04063607 A * | 2/1992 |
| JP | 05-012021 A | 2/1993 |
| JP | 05050314 A * | 3/1993 |
| JP | 6-114629 A | 4/1994 |
| JP | 06106402 A * | 4/1994 |
| JP | 7-241716 A | 9/1995 |
| JP | 8-71845 A | 3/1996 |
| JP | 09-085532 A | 3/1997 |
| JP | 10-094917 A | 4/1998 |
| JP | 2000-263328 A | 9/2000 |
| JP | 2002-028898 A | 1/2002 |
| JP | 2002-059313 | 2/2002 |
| JP | 2002-273620 A | 9/2002 |
| JP | 2003-311530 A | 11/2003 |

OTHER PUBLICATIONS

European Search Report mailed Apr. 4, 2011 for the corresponding European patent application No. 06745491.8.

Japanese Office Action mailed Mar. 8, 2011, for the corresponding Japanese patent application No. 2005-289710.

Japanese Decision of Rejection mailed Jun. 7, 2011 for the corresponding Japanese patent application No. 2005-289710.

Japanese Notice of Allowance mailed Jun. 7, 2011 for the corresponding Japanese patent application No. 2005-289711.

* cited by examiner

BORING TOOL AND METHOD OF BORING PILOT HOLE

CROSS-REFERENCE TO PRIOR APPLICATION

This is a United States National Phase Application Under 35 U.S.C. §371 of International Patent Application No. PCT/JP2006/308310 filed Apr. 20, 2006, which claims the benefit of Japanese Patent Application Nos. 2005-292102, filed Oct. 3, 2005, 2005-289711, filed Oct. 3, 2005 and 2005-292102, filed Oct. 5, 2005, all of which are incorporated by reference herein. The International Application was published Apr. 12, 2007 as WO 2007/039949 A1 under PCT Article 21(2).

FIELD OF THE INVENTION

The present invention relates to a boring tool, which is inserted into a pilot hole formed in a workpiece beforehand to cut the inner wall face of the pilot hole, and a method of boring a pilot hole in which the boring tool is used to form a bored hole having a predetermined inner diameter.

BACKGROUND OF THE INVENTION

As this type of boring tool, there is known a reamer disclosed, for example, in Patent Document 1 having a long cylindrical shank part rotated around an axis and an edge part formed on the tip of the shank part, in which a chip discharging groove extending axially to the rear end side is formed on the outer periphery of the edge part and a cutting edge is formed at a ridge part on the outer periphery at the tip of the wall face of the chip discharging groove facing forward in the tool rotating direction.

This reamer is used on attachment to a cutting tool disclosed, for example, in Patent Document 2. This cutting tool, which is attached to the main shaft end of a machine tool and the like, is rotated axially and also inserted into a pilot hole of a workpiece, for example, a stem guide hole, a valve hole on the cylinder head of an engine and the like, thereby cutting the inner wall face of the pilot hole to form a bored hole having a predetermined inner diameter.

FIG. 20 shows an example of a method in which a conventional reamer is used to bore a pilot hole. Further, FIG. 21 and FIG. 22 show an example of a conventional reamer.

A reamer 1 is constituted with a shank part 2 formed in a long cylindrical shape and an edge part 3 arranged at the tip of the shank part 2, as shown in FIG. 22.

The shank part 2 is made of a steel product and formed approximately in a multi-staged cylindrical shape. An attachment part 4 for attaching the reamer 1 to a cutting tool is provided on the rear end side thereof. A V-shaped groove 5, the center of which is recessed toward the rear end side of the shank part 2, is formed on the tip face of the shank part 2.

A coolant supplying port (not illustrated) is formed at the shank part 2 so as to penetrate through from the tip of the shank part 2 to the rear end side and thus opened on the V-shaped groove 5.

The edge part 3 is constituted with cemented carbide and formed approximately in a cylindrical shape. A raised part 6, which can be fitted into the V-shaped groove 5 formed on the tip face of the shank part 2, is formed on the rear end face thereof.

As shown in FIG. 21 and FIG. 22, six rows of chip discharging grooves 7 extending to the rear end side in the axis O direction and twisted at a predetermined angle forward in the tool rotating direction T, are arranged at the tip on the outer periphery of the edge part 3 peripherally at equal intervals in rotational symmetry every 60 degrees with respect to the axis O. In this instance, as shown in FIG. 22, a length of the chip discharging groove 7 in the axis O direction, S, is made shorter than a length of the edge part 3 constituted with cemented carbide in the axis O direction, L.

A cutting edge 10 is formed at a crossed ridge part between the wall face 8 of the chip discharging groove 7 facing forward in the tool rotating direction T and the outer peripheral face 9 continuing to the backside in the tool rotating direction T. In the thus formed cutting edge 10, the wall face 8 of the chip discharging groove 7 facing forward in the tool rotating direction T is provided as a cutting face, while the outer peripheral face 9 continuing to the backside in the tool rotating direction T is provided as a relief face.

As shown in FIG. 21, the chip discharging groove 7 is formed so as to provide a V-shaped cross sectional face, with the groove bottom formed in a recessed circular arc shape, and an angle formed by the V-shape is to be approximately 80 degrees. The wall face 8 facing forward in the tool rotating direction T as a cutting face is formed in such a manner as to extend radially approximately along a circle formed by the outer cross section of the edge part 3. Further, a communicating port (not illustrated) extending along the axis O and opened on the rear end side (raised part 6) is formed in the vicinity of the edge part 3 in the axis O direction. An ejection port 11 is formed extending from the communicating port to each of the chip discharging grooves 7 and opened at the groove bottom part.

Further, a back tapered part 12, which reduces in diameter gradually from the tip side to the rear end side, is formed at the edge part 3. As shown in FIG. 22, a length of the back tapered part 12 in the axis O direction, B, is made shorter than a length of the chip discharging groove 7 in the axis O direction, S. In other words, the length of the back tapered part 12 in the axis O direction, B, the length of the chip discharging groove 7 in the axis O direction, S, and the length of the edge part 3 in the axis O direction, L, are related to be L>S>B.

The reamer 1 is not only attached to a cutting tool and rotated around the axis O but also carried to the tip side in the axis O direction and inserted into a pilot hole formed on a workpiece W beforehand, thereby cutting the inner wall face of the pilot hole. On this cutting process, since the chip discharging groove 7 is formed so as to be twisted forward in the tool rotating direction, chips generated by the cutting edge 10 are consequently guided to the tip side of the reamer 1. Further, coolant is ejected via a coolant supplying port and a communicating port from an ejection port 11, by which the chips are discharged to the tip side of the reamer 1 in such a manner as to be flowed by the coolant flowing through the chip discharging groove 7.

Then, as shown in FIG. 20, in a conventional method of boring a pilot hole, the reamer 1 in which a length of the edge part 3, L, is longer than a length of the pilot hole, H, is used to bore the pilot hole. As a result, the edge part 3 of the reamer 1 is arranged so as to penetrate through a bored hole formed by boring the inner wall face of the pilot hole.

In the above-described reamer, a coolant supplying port for supplying coolant to the edge part is formed at a shank part so as to penetrate through the shank part, and a communicating port communicatively connected to the coolant supplying port and an ejection port extending from the communicating port to the groove bottom part of the chip discharging groove are formed at the edge part.

Coolant is ejected from the ejection port via the coolant supplying port and the communicating port, by which the coolant is supplied to a pilot hole of a workpiece to reduce the cutting resistance when the cutting edge formed at the edge part cuts into the inner wall face of the pilot hole. As a result, not only is chatter of the reamer suppressed to accurately form a bored hole but also early wear of the cutting edge is suppressed to provide an increase in the life of the reamer.

Further, an edge part at which the cutting edge is formed is constituted with hard cemented carbide, and the edge part constituted with the cemented carbide is jointed by soldering at the tip of a steel-made shank part to provide a reamer, or a shank part is made of cemented carbide and sintered integrally with the edge part to provide a reamer (refer to Patent Document 1).

In these reamers, an edge part constituted with hard cemented carbide is used to cut the inner wall face of a pilot hole formed on a workpiece, thereby wear resistance is improved to provide an increase in the life of the reamers.

PATENT DOCUMENT 1: Japanese Unexamined Patent Application, First Publication No. 2000-263328

PATENT DOCUMENT 2: Japanese Unexamined Patent Application, First Publication No. 2002-59313

DETAILED DESCRIPTION OF THE INVENTION

Problems to be Solved by the Invention

Meanwhile, in a conventional reamer shown in FIG. 21 and FIG. 22, a chip discharging groove is formed in such a manner as to be opened radially outwardly to a great extent, with the cross section formed in a V-shape, although no chips are allowed to pass through the chip discharging groove because the chips are discharged to the tip side of the reamer. However, the chip discharging groove is formed so as to notch the edge part greatly, by which the reamer is decreased in rigidity to cause turnout of the reamer when rotated at high speed, thus resulting in a failure to accurately form a bored hole, which poses a problem.

There is also a case where the reamer may break from, for example, a part at which an ejection port is formed, due to the cutting resistance during the cutting process.

Further, in a reamer at which the cemented carbide-made edge part is jointed to the tip of the steel-made shank part by soldering, a great distortion is caused on soldering the edge part to the shank part due to the fact that the cemented carbide is about $5.0 \times 10^{-6}/°C$. in the coefficient of thermal expansion, which is significantly different from that of the steel, about $12.1 \times 10^{-6}/°C$., thus resulting in curvature of the reamer. Still further, a soldered part is decreased in strength of the steel due to the thermal influence on soldering, resulting in a lack of overall rigidity of the reamer and causing turnout of the reamer when rotated at high speeds. For this reason, there is posed a problem that no bored hole can be accurately formed by using the above-constituted reamer.

In addition, in the case of a small reamer with a diameter of 10 mm or less, there is great difficulty in forming a coolant supplying port which penetrates through a long steel-made shank part, thus resulting in a failure in stably manufacturing the reamer.

On the contrary, where both the shank part and the edge part are constituted with cemented carbide and then sintered integrally to form a reamer, cemented carbide as a raw material is subjected to extrusion molding to form a reamer integrally from the edge part to the shank part and then sintered. Therefore, a coolant supplying port can be formed with comparative ease even on a small-diameter reamer. However, since cemented carbide as a material is subjected to extrusion molding and the like to mold a reamer, such a through port is formed, which penetrates through the shank part and the edge part in equal diameter. Thereby, only a reamer is manufactured in which the coolant supplying port of the shank part is equal in diameter to the communicating port of the edge part. As a result, there is a case where coolant is insufficiently supplied to a workpiece.

Further, the cutting process of a relatively hard workpiece requires the edge part to be constituted with harder cemented carbide. In this instance, there is a problem such that the shank part is also constituted with harder cemented carbide on integrated sintering to result in a higher manufacturing cost of the reamer.

Still further, as described previously, where the reamer 1 is used in which a length of the edge part 3, L, is longer than a length of the pilot hole, H, the edge part 3 is slidingly in contact with the inner wall face of the bored hole at a larger area, thus resulting in a greater cutting resistance. The chip discharging groove 7 and the ejection port 11 of coolant are also installed at the edge part 3. Therefore, where the length of the edge part 3, L, is longer than necessary, the chip discharging groove 7 is made longer in length to decrease rigidity of the reamer 1. As a result, there is a concern that the reamer 1 may be broken due to the cutting resistance. There is also a problem that the reamer 1 is subjected to turnout and chatter due to the lack of rigidity, when rotated at high speeds, and is unable to accurately form a bored hole.

The present invention has been made in view of the above-described problems, an object of which is to provide a method of boring a pilot hole capable of accurately forming a bored hole by securing the rigidity of a boring tool to prevent the turnout of the boring tool when rotated at high speed and enabling an increase in the life by preventing breakage of the boring tool thereof by reducing the cutting resistance and also provide a boring tool appropriate for the method.

Another object of the present invention is to provide a boring tool, which is provided with an edge part constituted with cemented carbide depending on the hardness of a workpiece, etc., thereby having a sufficient rigidity and also capable of accurately and efficiently cutting the workpiece by supplying coolant to the workpiece, and the boring tool, which can be manufactured at lower costs.

Means for Solving the Problems

In order to solve the above-described problem, the present invention is a boring tool which is inserted into a pilot hole formed on a workpiece beforehand to cut the inner wall face of the pilot hole. The boring tool is provided with a shank part rotated around an axis, in which an edge part having a cutting edge is installed at the tip of the shank part, a chip discharging groove extending from the tip side to the rear end side is formed on the outer periphery of the edge part, the cutting edge is formed at a crossed ridge part between the wall face of the chip discharging groove facing forward in the tool rotating direction and the outer peripheral face of the edge part, and the cross section of the chip discharging groove vertical to the axis is formed in a U-shape.

The boring tool of the present invention is provided with a first land part formed on the outer peripheral face so as to continue to the cutting edge, a relief part continuing to the back side of the first land in the tool rotating direction and retracted radially inwardly, and a second land part formed so as to continue to the back side of the relief part in the tool rotating direction.

In the boring tool of the present invention, the relief part is provided with a discharge port for discharging coolant, and the discharge port is opened at the rear end side, which is more than ⅔ a length of the edge part from the tip of the edge part in the axis direction.

In order to solve the above-described problem, the present invention is a boring tool which is provided with an edge part having a cutting edge at the tip of a shank part, in which the edge part constituted with cemented carbide is jointed by soldering to the tip of the shank part constituted with cemented carbide.

In the boring tool of the present invention, the edge part is constituted with cemented carbide, which is harder than the cemented carbide constituting the shank part.

In order to solve the above-described problem, the present invention is a method of boring a pilot hole by inserting a boring tool into a pilot hole formed on a workpiece beforehand to cut the inner wall face of the pilot hole, thereby forming a bored hole. In the method, a boring tool is used provided with a shank part rotated around an axis and an edge part arranged at the tip of the shank part, in which a chip discharging groove extending from the tip side to the rear end side is formed at the edge part, a cutting edge is formed at a crossed ridge part between the wall face of the chip discharging groove forward in the tool rotating direction and the outer peripheral face of the edge part, and a length of the cutting edge in the axis direction is made shorter than a length of the pilot hole.

In the method of boring a pilot hole in the present invention, a boring tool is used in which the edge part is constituted with a material harder than the shank part, and a length of the edge part in the axis direction is made shorter than a length of the pilot hole.

In order to solve the above-described problem, the present invention is a boring tool used in the method of boring a pilot hole, in which a back tapered part is formed at the edge part so as to reduce gradually in outer diameter from the tip face to the rear end side and a length of the back tapered part in the axis direction is made shorter than a length of the edge part in the axis direction.

In the boring tool of the present invention, a length of the chip discharging groove in the axis direction is made shorter than a length of the back tapered part in the axis direction.

In the boring tool of the present invention, the tip of the shank part is made smaller in outer diameter by 0.02 mm or more than the rear end side of the back tapered part in outer diameter.

In the boring tool of the present invention, the cross section of the chip discharging groove vertical to the axis is formed in a U-shape.

The boring tool of the present invention is provided on the outer peripheral face with a first land part formed so as to continue to the cutting edge, a relief part continuing to the back side of the first land in the tool rotating direction and retracted radially inwardly and a second land part continuing to the back side of the relief part in the tool rotating direction.

Figure 1:
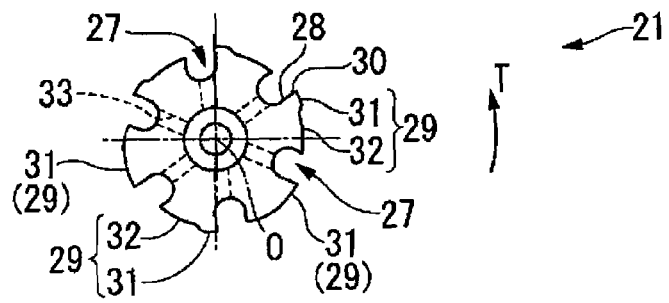
FIG. 1 is a front elevational view of a reamer, which is Embodiment 1 of the present invention.

DESCRIPTION OF THE REFERENCE SYMBOLS 1, 21: reamer (boring tool)
2, 22: shank part
3, 23: edge part
7, 27: chip discharging groove
8, 28: wall face facing forward in tool rotating direction T
9, 29: outer peripheral face
30: cutting edge
31: land part
12, 32: back tapered part
34, 51: first land part
32, 52: relief part
35, 53: second land part
36, 54: discharge port

BEST MODE FOR CARRYING OUT THE INVENTION

Figure 2:
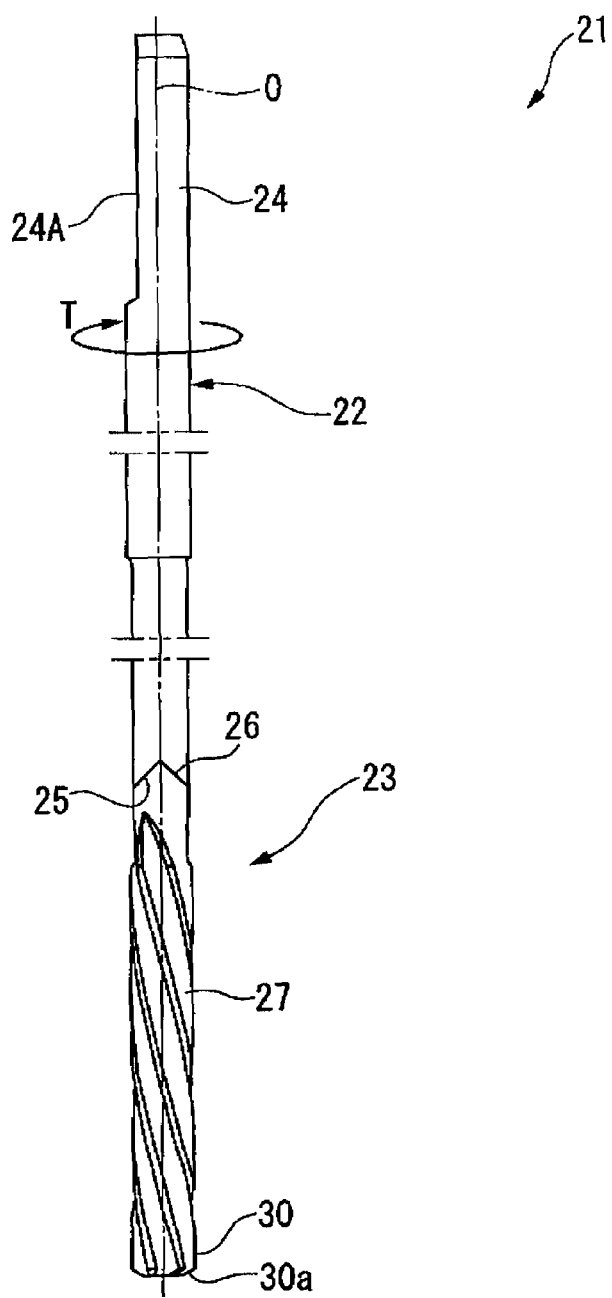
FIG. 2 is a side elevational view of the reamer given in FIG. 1.
Figure 3:
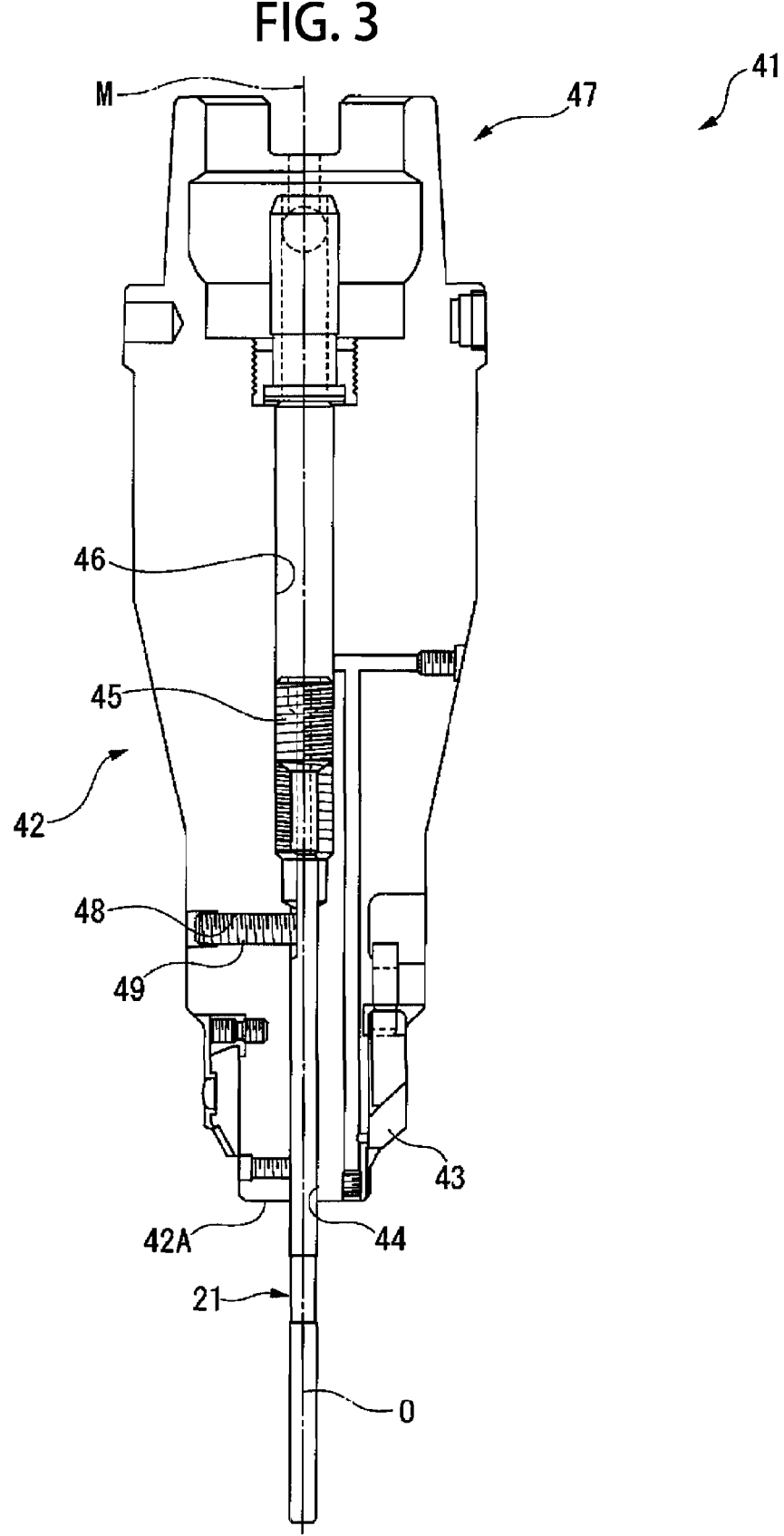
FIG. 3 is a front elevational view of a reamer, which is Embodiment 2 of the present invention.

Hereinafter, an explanation will be made for a boring tool of Embodiment 1 of the present invention by referring to the attached drawings. FIG. 1 and FIG. 2 show a reamer as a boring tool of the embodiment in the present invention. Further, FIG. 3 shows a cutting tool to which the reamer is attached.

The reamer 21 is constituted with a long cylindrical shank part 22 and an edge part 23 arranged at the tip (below in FIG. 2) of the shank part 22.

The shank part 22 is formed at the center of the axis O approximately in a multi-staged cylindrical shape, and an attachment part 24 for attaching the reamer 21 to a cutting tool 41 is installed at the rear end side (above in FIG. 2). A flat face 24A extending parallel to the axis O is installed at the attachment part 24.

The tip of the shank part 22 is made smaller in diameter by one step than the rear end side thereof, and a V-shaped groove 25, the central part of which is recessed to the rear end side of the shank part 22, is formed on the tip face in such a manner that a V-shaped bisector is located on the axis O, with the groove bottom part kept orthogonal to the axis O. In this instance, an angle formed by two side wall faces of the V-shaped groove 25 is in a range from 60 degrees to 120 degrees. In the present embodiment, the angle is set to be 90 degrees.

Further, a coolant supplying port is formed at the shank part 22 so as to penetrate through the shank part 22 from the tip side to the rear end side and opened on the V-shaped groove 25.

The edge part 23 is also formed at the center of the axis O approximately in a cylindrical shape. A raised part 26, which can be fitted into the V-shaped groove 25 formed on the tip face of the shank part 22 and the cross section of which is raised in a V-shape, is formed on the rear end face of the edge part 23 in such a manner that a V-shaped bisector is located on the axis O, with the V-shaped ridge kept orthogonal to the axis O.

A plurality of chip discharging grooves 27 extending to the rear end side in the axis O direction and twisted at a predetermined twist angle (15 degrees in the present embodiment) forward in the tool rotating direction T are arranged on the outer periphery of the tip of the edge part 23 peripherally at equal intervals in rotational symmetry by a predetermined angle with respect to the axis O. In Embodiment 1, as shown in FIG. 1, six rows of the chip discharging grooves 27 are arranged in rotational symmetry every 60 degrees with respect to the axis O.

A cutting edge 30 is formed at a crossed ridge part between the wall face 28 of these chip discharging grooves 27 facing forward in the tool rotating direction T and the outer peripheral face 29 continuing to the backside in the tool rotating direction T, and an interlocking part 30a continuing to the cutting edge 30 is formed on the outer periphery of the crossed ridge part between the wall face 28 facing forward in the tool rotating direction T and the tip face of the edge part 23.

The cutting edge 30 is formed as described above, by which the wall face 28 of the chip discharging groove 27 facing forward in the tool rotating direction T is given as a cutting face and the outer peripheral face 29 continuing to the backside in the tool rotating direction T is given as a relief face. Then, the cutting edge 30 is formed helically as with the chip discharging groove 27 so as to be twisted at a predetermined twist angle (15 degrees in the present embodiment) forward in the tool rotating direction T around the axis O as it moves closer to the rear end side. In the present embodiment, the rotational trace line of the cutting edge 30 around the axis O is to be formed in a cylindrical surface at the center of the axis O.

In this instance, the cross section of chip discharging groove 27 vertical to the axis O is formed in a U-shape as shown in FIG. 1, that is, in such a manner that the wall face 28 of the chip discharging groove 27 facing forward in the tool rotating direction T is opposed approximately parallel to the wall face facing backward in the tool rotating direction on the cross section via the groove bottom formed in a recessed circular arc shape. The wall face 28 facing forward in the tool rotating direction T, which is provided as a cutting face, is formed so as to extend radially approximately along a circle formed by the outer cross section of the edge part 23.

Further, a land part 31, which is formed in a circular arc on a cross section vertical to the axis O and the radius of which is equal to the outer diameter of the cutting edge 30, is formed at a part continuing to the cutting edge 30 on four outer peripheral faces 29 of six outer peripheral faces provided as a relief face. A relief part 32, which is retracted radially inwardly, is formed at the back side of the land part 31 in the tool rotating direction T. In addition, the relief part 32 of the present embodiment is formed on a cross section vertical to the axis O so as to provide a raised circular arc, the radius of which is slightly smaller than the outer diameter of the cutting edge 30. Further, the relief part 32 is not formed on the remaining two outer peripheral faces 29 and a whole part of the outer peripheral face 29 is provided as the land part 31.

Still further, the edge part 23 is provided with a communicating port (not illustrated) extending along the axis O and opened at the raised part 26 and also provided with an ejection port 33 extending from the communicating port to each of the chip discharging grooves 27 and opened at the groove bottom part thereof.

The reamer 21 is used on attachment to the cutting tool 41 given in FIG. 3. The cutting tool 41 is provided with a multistage cylindrical tool main body 42 rotated around the axis M, and a cutting insert 50 is disposed at the outer periphery of the tip of the tool main body 42.

An attachment port 44 extending so as to run along the axis M is drilled on the tip face 42A of the tool main body 42. A coolant port 46 is provided into which a position adjusting bolt 45 is inserted so as to be communicatively connected to the rear end side of the attachment port 44. The coolant port 46 is opened at a fixing part 47 installed at the rear end side of the tool main body 42.

A threaded hole 48 opened on the side face of the tool main body 42 and communicatively connected to the attachment port 44 is also formed, and a clamp screw 49 is screwed thereinto.

The reamer 21 is inserted into an attachment port 44 drilled on the tip face 42A of the tool main body 42 and arranged in such a manner that the rear end face of the shank part 22 is brought into contact with the tip face of the position adjusting bolt 45 and the flat face 24A of the shank part 22 faces the direction at which the threaded hole 48 of the tool main body 42 is installed and also the axis O of the reamer 21 coincides with the axis M of the tool main body 42. Then, the clamp screw 49 screwed into the threaded hole 48 of the tool main body 42 is screwed thereinto to press a flat face 24A, by which the reamer 21 is fixed to the tool main body 42.

The cutting tool 41 to which the reamer 21 is attached as described above is fixed to the main shaft end of a machine tool via a fixing part 47 and carried to the tip direction of the axis M (axis O), while being rotated around the axis M (axis O), after being adjusted for the position with respect to the reamer 21 in the axis M direction. Then, the reamer 21 is inserted into, for example, a stem guide hole (a pilot hole formed on a workpiece) to cut the inner wall face of the stem guide hole, thereby forming a bored hole having a predetermined inner diameter.

In performing the cutting process by using the reamer 21, coolant is supplied to a coolant port 46 of the tool main body 42 through a pipe of the machine tool. The coolant supplied to the coolant port 46 is supplied to the edge part 23 through a coolant supplying port formed at the shank part 22 of the reamer 21, and ejected toward the inner wall face of the pilot hole from the groove bottom part of the chip discharging groove 27 through a communicating port and an ejection port 33 formed at the edge part 23.

Chips generated on cutting the inner wall face of the pilot hole are guided to the tip of the reamer 21 because the chip discharging groove 27 is formed so as to be twisted forward in the tool rotating direction T. Further, coolant is ejected from the ejection port 33 via the coolant supplying port and the communicating port, by which the chips are discharged to the tip of the reamer 21 in such a manner as to be flowed by the coolant.

According to the reamer 21 of Embodiment 1, the chip discharging groove 27 is provided in a U-shaped cross section, not widely opened radially outwardly and smaller in a notched part, thereby securing rigidity of the reamer 21. The reamer 21 is, therefore, able to accurately form a bored hole by preventing turnout thereof when rotated at high speeds, and also enabling an increase in the life by suppressing breakage thereof due to cutting resistance.

Further, since the chip discharging groove 27 is made small in the cross section, coolant is allowed to pass through the chip discharging groove 27 at a greater speed when ejected from an ejection port 33 opened at the groove bottom part of the chip discharging groove 27, thus making it possible to discharge chips generated by the cutting edge 30 toward the tip of the reamer 21 without fail. Therefore, since no chips pass through the chip discharging groove 27, the chips can be discharged without fail, even when the chip discharging groove 27 is made small in the cross sectional area, thereby the reamer 21 can be used to effect a smooth boring.

Still further, regarding six outer peripheral faces 29 continuing to each of the cutting edges 30 and provided as a relief face, a land part 31 and a relief part 32 are formed on four of the outer peripheral faces 29 and the remaining two of the outer peripheral faces 29 are provided as a land part 31 as a whole. Thereby, the reamer 21 is able to reduce the cutting resistance on boring a pilot hole and the land part 31 is also able to stabilize the rotation of the reamer 21. As a result, a bored hole can be formed more accurately. In addition, since the land part 31 slides on the inner wall face of the bored hole after the cutting process, the inner wall face of the bored hole is subjected to varnish processing to make the surface smooth.

Next, an explanation will be made for a reamer 21 of Embodiment 2 by referring to FIG. 4 and FIG. 5. In addition, the same members as those of Embodiment 1 will be given the same reference numerals, the explanation of which will be omitted here.

Figure 4:
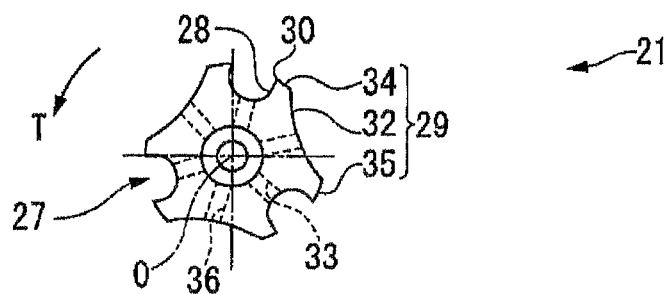
FIG. 4 is a front elevational view of the reamer, which is Embodiment 2 of the present invention.
Figure 5:
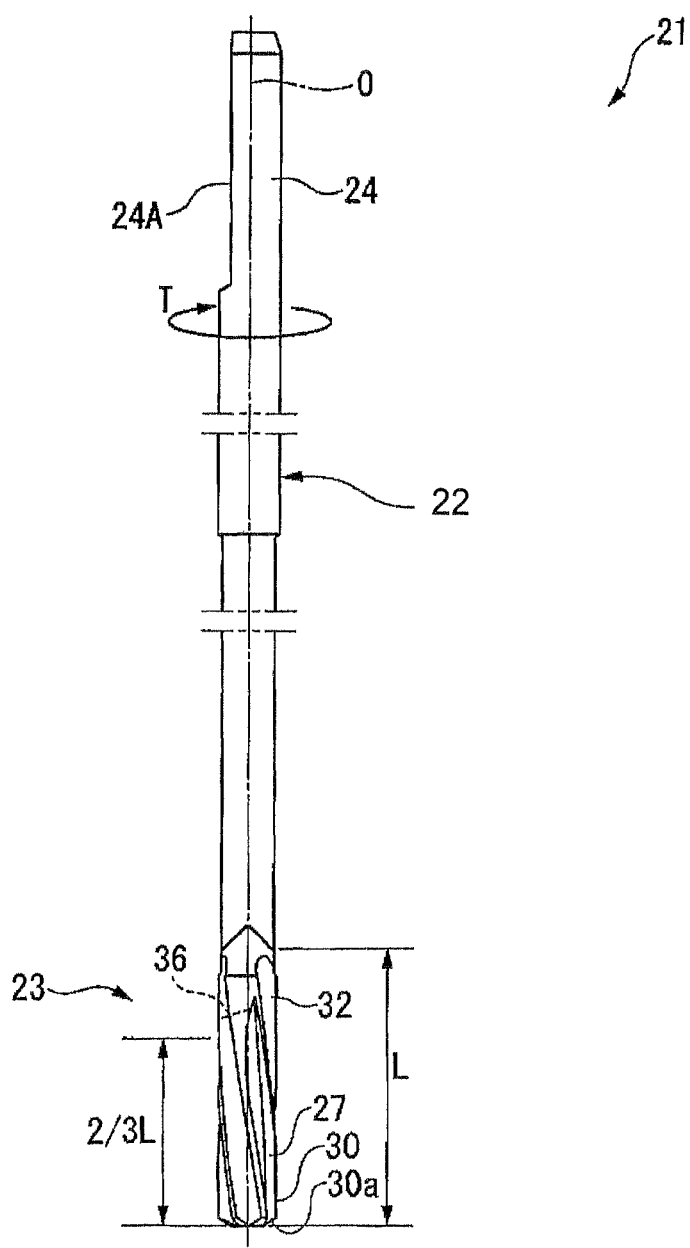
FIG. 5 is a side elevational view of the reamer given in FIG. 3.

As shown in FIG. 4, the reamer 21 of Embodiment 2 is provided with three rows of chip discharging grooves 27 having a V-shaped cross section, in which these chip discharging grooves 27 are arranged in rotational symmetry every 120 degrees with respect to the axis O. In other words, the reamer 21 is a three-cutting edge reamer at which the cutting edge 30 is formed at a ridge on the outer periphery of the wall face 28 of the chip discharging groove 27 facing forward in the tool rotating direction T.

The outer peripheral face 29 continuing to the cutting edge 30 and provided as a relief face is provided with a first land part 34 formed so as to continue to the cutting edge 30, a relief part 32 continuing to the back side of the first land in the tool rotating direction T and retracted radially inwardly and a second land part 35 formed so as to continue to the back side of the relief part 32 in the tool rotating direction T. The first land part 34 and the second land part 35 are formed in a circular arc equal in radius at the center of the axis O. Further, the relief part 32 is formed in an R groove shape which is greater in width, and shallower in groove depth than the chip discharging groove 27 on a cross section vertical to the axis O and raised radially inwardly.

In Embodiment 1 which has been described previously, the chip discharging groove 27 and the relief part 32 are formed all over at the edge part 23. In contrast, in Embodiment 2, the relief part 32 is formed all over at the edge part 23, whereas the rear end of the chip discharging groove 27 is discontinued before the rear end of the edge part 23.

Further, an ejection port 33 is formed opened from a communicating port (not illustrated) formed at the edge part 23 toward the groove bottom part on each of the chip discharging grooves 27. Also formed is a discharge port 36 opened toward the groove bottom part of the R groove formed by the relief part 35.

When a length of the edge part 23 in the axis direction is given as L, the opening part of the discharge port 36 is arranged at the rear end side, which is more than ⅔ of the L from the tip of the edge part 23.

The reamer 21 of Embodiment 2 in which the chip discharging groove 27 has a U-shaped cross section is able to provide an effect similar to that of the reamer 21 of Embodiment 1. Further, since the relief part 32 is formed on the outer peripheral face 29, which is provided as a relief face, a part sliding on the inner wall face of a bored hole can be adjusted, thereby reducing the cutting resistance of the reamer 21. Still further, the first land part 34 and the second land part 35 are formed, by which the bored hole slides on the first and the second land parts 34, 35 to make the inner wall face of the bored hole smooth. In addition, these first and second land parts 34, 35 serve as a guide, thereby rotating the reamer 21 stably to accurately form the bored hole.

Further, coolant is supplied not only from an ejection port 33 opened at the groove bottom part of the chip discharging groove 27 but also from a discharge port 36 opened at the groove bottom part of the R groove formed by the relief part 32, thus making it possible to secure the discharge of chips by the coolant.

Still further, when a length of the edge part 23 in the axis direction is given as L, the discharge port 36 is opened at the rear end side, which is more than ⅔ of the L from the tip of the edge part 23. Therefore, the coolant discharged from the relief part 32 to the tip of the edge part 23 is allowed to pass through at a greater speed, and chips generated by the cutting edge 30 can be discharged more reliably to the tip of the reamer 21.

An explanation has been so far made for the reamer 21, which is an embodiment of the present invention. The present invention shall not be limited thereto and can be modified whenever necessary, as long as it does not depart from the technical idea of the invention.

Figure 6:
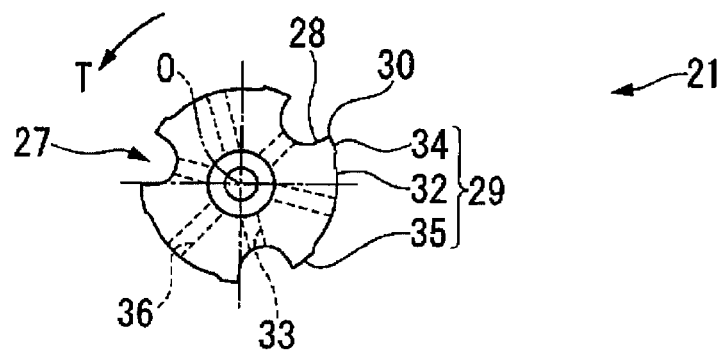
FIG. 6 is a front elevational view of a reamer of another embodiment in the present invention.

For example, as shown in FIG. 6, the relief part 32 installed on the outer peripheral face 29 continuing to the cutting edge 30 may be formed so as to be raised radially outwardly and in a circular arc at the center of the axis O. The relief part 32 is formed as described above, by which a part notching the edge part 23 can be made smaller to improve rigidity of the reamer 21.

Figure 7:
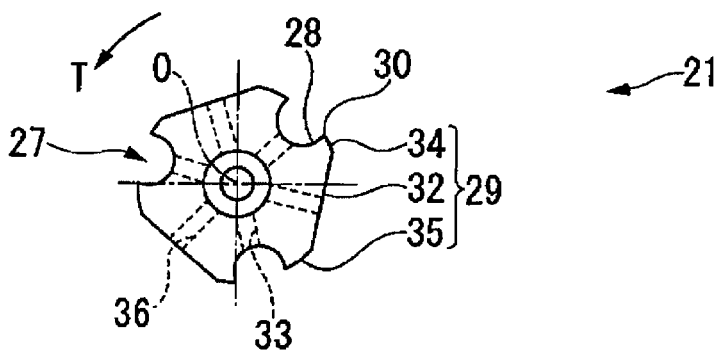
FIG. 7 is a front elevational view of a reamer of another embodiment in the present invention.

Further, as shown in FIG. 7, the relief part 32 installed on the outer peripheral face 29 continuing to the cutting edge 30 may be formed in a flat face shape in such a manner that the cross section of the edge part 23 assumes approximately a regular triangle. In the reamer 21 that has the above configuration, a part of the circle made by the outer shape of the edge part 23 can be scraped linearly on the cross section to provide the relief part 32. As a result, the reamer 21 can be manufactured at lower costs.

Figure 8:
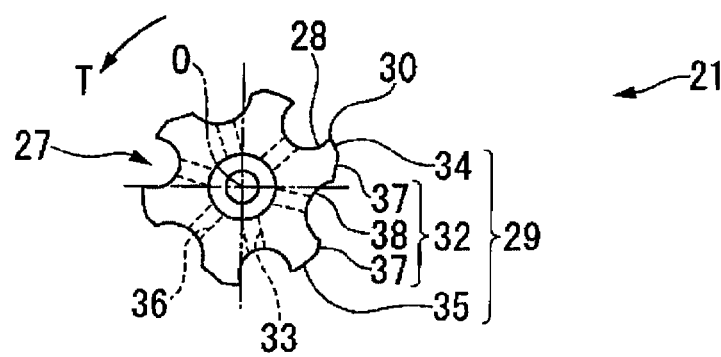
FIG. 8 is a front elevational view of a reamer of another embodiment in the present invention.

Still further, as shown in FIG. 8, the relief part 32 installed on the outer peripheral face 29 continuing to the cutting edge 30 may be constituted with a flat face part 37 formed in a flat face shape, and an R groove part 38 at which the central part of the flat face part 37 is notched in an R groove shape so as to be raised radially inwardly. The above constitution makes it possible not only to easily install the relief part 32 but also to reliably supply coolant through the R groove part 38 to the tip.

Still further, the chip discharging groove 27 has been explained by referring to that which is formed so as to be twisted forward in the tool rotating direction T as it moves toward the rear end side of the reamer 21. However, the present invention shall not be limited thereto and includes cases where the chip discharging groove 27 may be formed so as to be twisted backward in the tool rotating direction T and formed linearly so as not to be twisted. In these cases, although chips generated by the cutting edge 30 are not guided to the tip of the reamer 21, they can be discharged to the tip of the reamer 21 because coolant is allowed to flow at a greater speed through the chip discharging groove 27 to the tip of the reamer 21.

In addition, the reamer 21 has been explained as that which is to be attached to the cutting tool 41 given in FIG. 3. The present invention includes a case where the reamer 21 may be used by being attached to other cutting tools, adaptors and the like.

Figure 9:
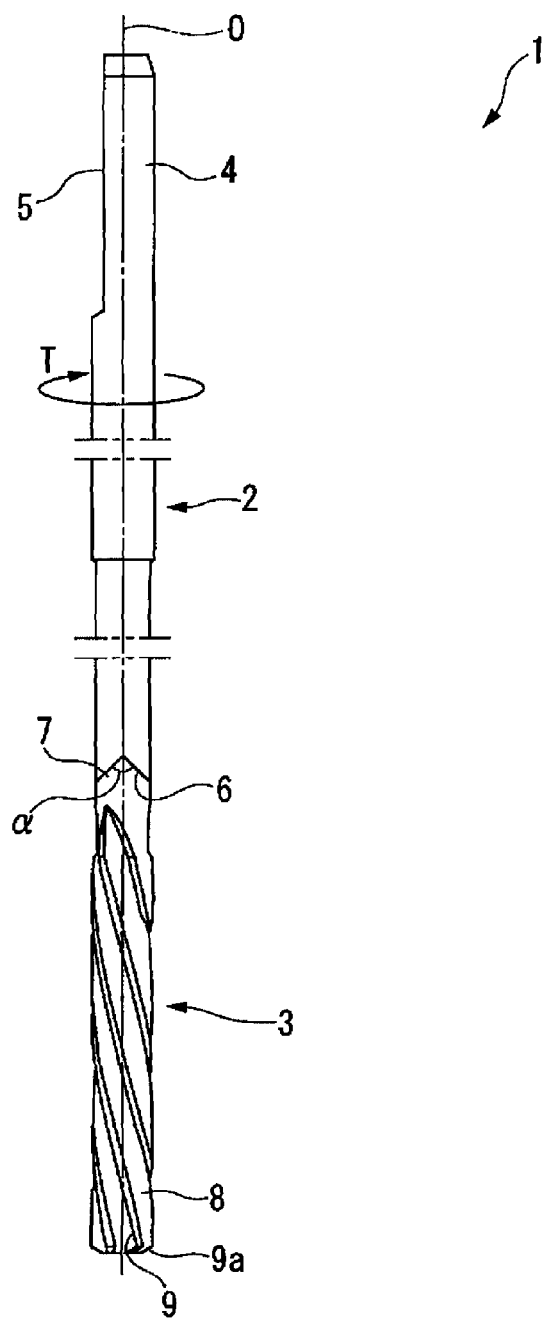
FIG. 9 is a side elevational view of a reamer of the embodiment in the present invention.
Figure 10:
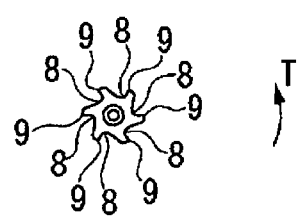
FIG. 10 is a front elevational view of the reamer given in FIG. 9.
Figure 11:
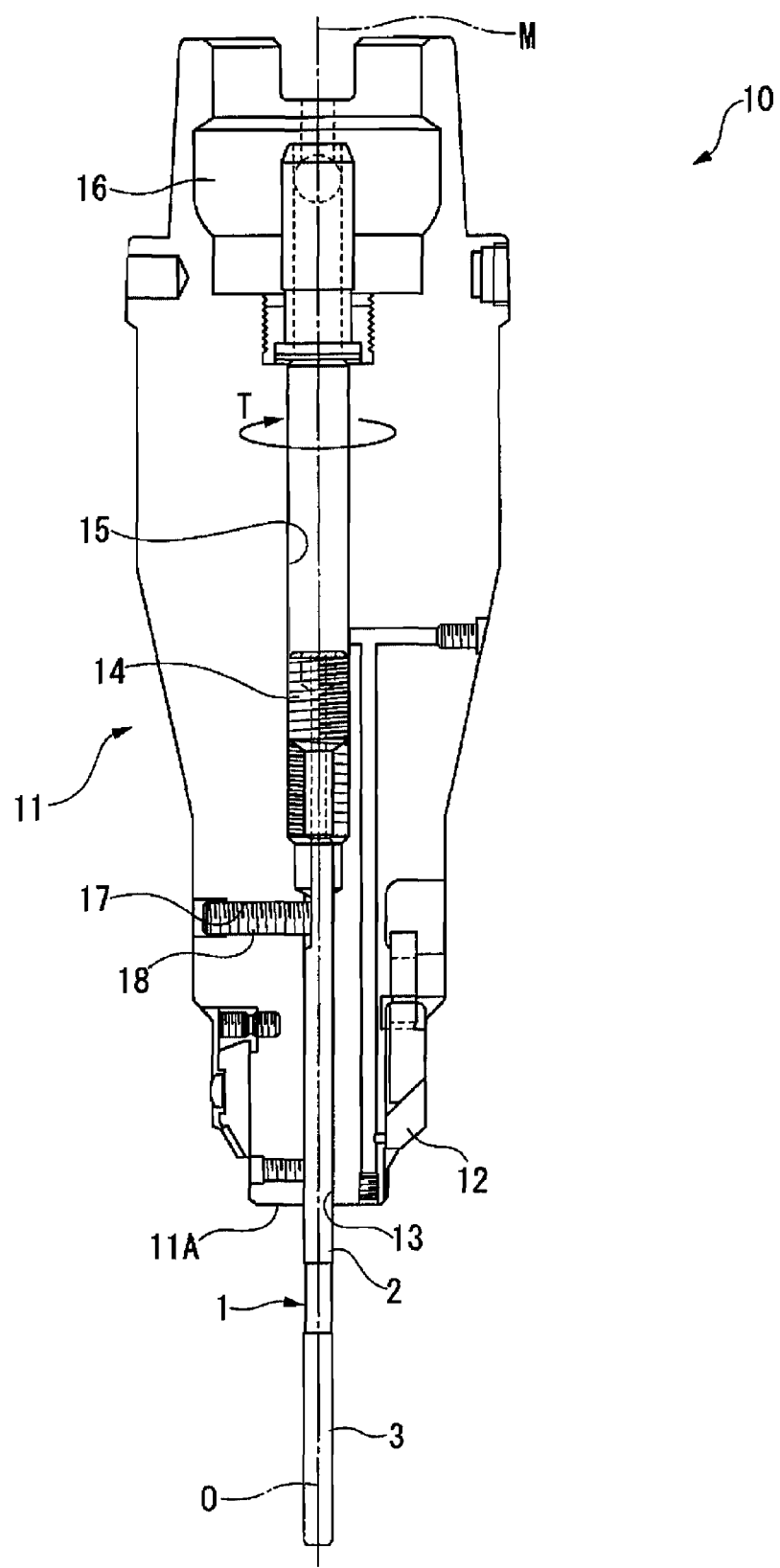
FIG. 11 is a partial cross sectional view of the side face of a cutting tool which is used on attachment to the reamer given in FIG. 9.

Hereinafter, an explanation will be made for a boring tool, which is an embodiment of the present invention, by referring to the attached drawings. FIG. 9 and FIG. 10 show a reamer as the boring tool of an embodiment in the present invention. Further, FIG. 11 shows a cutting tool to which the reamer is attached.

The reamer 1 is constituted with a long cylindrical shank part 2 and an edge part 3 arranged at the tip (below in FIG. 9) of the shank part 2.

The shank part 2 is formed approximately in a multi-stage cylindrical shape at the center of the axis O, and on the rear end side thereof (above in FIG. 9) there is provided an attachment part 4 for attaching the reamer 1 to the cutting tool 10. The attachment part 4 is provided with a flat face 5 extending parallel to the axis O.

The tip of the shank part 2 is made smaller in diameter by one step than the rear end side thereof, and a V-shaped groove 7, the central part of which is recessed to the rear end side of the shank part 2, is formed on the tip face in such a manner that a V-shaped bisector is located on the axis O, with the groove bottom part kept orthogonal to the axis O.

In this instance, an angle, a, which is formed by two side wall faces of the V-shaped groove 7, is in a range from 60 degrees to 120 degrees, and the angle is set to be 90 degrees in the present embodiment.

Further, a coolant supplying port (not illustrated) is formed at the shank part 2 so as to penetrate through the shank part 2 from the tip side to the rear end side along the axis O.

Then, the shank part 2 is constituted with cemented carbide mainly based on tungsten carbide powder. The cemented carbide is made up of a material with an average grain size of about 1.0 μm. Further, the hardness after being sintered is 91.0 HRA in terms of Rockwell A hardness (JIS Z 2245) and the coefficient of thermal expansion is $5.1 \times 10^{-6}$/° C.

The edge part 3 is also formed approximately in a cylindrical shape at the center of the axis O. A raised part 6, which can be fitted into the V-shaped groove 7 formed on the tip face of the shank part 2 and the cross section of which is raised in a V-shape, is formed on the rear end face of the edge part 3 in such a manner that a V-shaped bisector is located on the axis O, with a V-shaped ridge also kept orthogonal to the axis O. In addition, a length of the edge part 3 in the axis O direction is made shorter than a length of the shank part 2 in the axis O direction.

A plurality of chip discharging grooves 8 extending to the rear end side in the axis O direction and twisted at a predetermined angle forward in the tool rotating direction T are arranged on the outer periphery of the tip of the edge part 3 peripherally at equal intervals in rotational symmetry by a predetermined angle with respect to the axis O. In the present embodiment, as shown in FIG. 10, six rows of the chip discharging grooves 8 are arranged in rotational symmetry every 60 degrees with respect to the axis O.

The cutting edge 9 is formed at a crossed ridge part between the wall face of the chip discharging groove 8 facing forward in the tool rotating direction T and the outer peripheral face continuing to the back side in the tool rotating direction T, on the tip thereof, that is, at the ridge on the outer periphery of the wall face. Further, the interlocking part 9a continuing to the tip of the cutting edge 9 is formed on the outer periphery of the crossed ridge part between the wall face and the tip face of the edge part 3.

The cutting edge 30 is formed as described above, by which the wall face of the chip discharging groove 8 facing forward in the tool rotating direction T is provided as a cutting face, and the outer peripheral face continuing to the back side in the tool rotating direction T is provided as a relief face. Then, as with the chip discharging groove 8, the cutting edge 9 is formed helically so as to be twisted at a predetermined twist angle forward in the tool rotating direction T around the axis O, when it moves closer to the rear end side. In addition, in the present embodiment, the rotational trace line of the cutting edge 9 around the axis O is to be formed in a cylindrical surface at the center of the axis O. Further, the rear end side of the edge part 3 is made smaller in outer diameter by one step than the cylindrical surface, that is, equal in diameter to that of the tip of the shank part 2.

Further, the edge part 3 is provided with a communicating port (not illustrated) extending along the axis O at a position relatively away from the tip of the edge part 3 to the rear end side and opened at the rear end side. It is also provided with an ejection port extending from the communicating port to the tip on the outer periphery and opened so as to face the groove bottom part of each of the chip discharging grooves 8.

Then, the edge part 3 is constituted with an ultra fine particle alloy, which is one type of cemented carbide. The ultra fine particle alloy is constituted with a material, the average grain size of which is about 0.6 μm, smaller than the cemented carbide constituting the shank part 2. Further, the alloy after being sintered is harder than the cemented carbide constituting the shank part 2, which is 94.0 HRA in terms of Rockwell A hardness GUS Z 2245). The coefficient of thermal expansion is $5.0 \times 10^{-6}$/° C.

The shank part 2 and the edge part 3 are separately molded into a predetermined shape by using a material of cemented carbide based on tungsten carbide powder and then subjected to sintering. Therefore, a coolant supplying port of the shank part 2 and a communicating port of the edge part 3 can be respectively made into those having an optimal diameter.

As a result, the thus molded shank part 2 and edge part 3 are soldered, while the V-shaped groove 7 of the shank part 2 is fitted into the raised part 6 of the edge part 3 to keep them coaxial and made into a reamer 1.

The reamer 1 is used on attachment to the cutting tool 10 given in FIG. 11. The cutting tool 10 is provided with a multi-stage cylindrical tool main body 11 rotated around the axis M, and a cutting insert 50 is disposed at the leading end on the outer periphery of the tool main body 11.

An attachment port 13 extending so as to run along the axis M is drilled on the tip face 11A of the tool main body 11. A coolant port 15, into which a position adjusting bolt 14 is inserted, is made so as to be communicatively connected to the rear end side of the attachment port 13. The coolant port 15 is opened at a fixing part 16 installed on the rear end side of the tool main body 11.

Further, a threaded hole 17 is opened on the side face of the tool main body 11 and communicatively connected to the attachment port 13, and a clamp screw 18 is screwed thereinto.

The reamer 1 is inserted into the attachment port 13 drilled on the tip face 11 of the tool main body 11 and arranged in such a manner that the rear end face of the shank part 2 is brought into contact with the tip face of the position adjusting bolt 14 and the flat face 5 of the shank part 2 faces a direction at which the threaded hole 17 of the tool main body 11 is made and also the axis O of the reamer 1 coincides with the axis M of the tool main body 11. Then, the clamp screw 18 screwed into the threaded hole 17 of the tool main body 11 is screwed to press a flat face 5, by which the reamer 1 is fixed to the tool main body 11.

The cutting tool 10, to which the reamer 1 is attached as described above, is fixed to the main shaft end of a machine tool via the fixing part 16 and adjusted for the position with respect to the axis M direction of the reamer 1. Then, the cutting tool 10 is rotated around the axis M (axis O) and carried to the tip of the axis M (axis O), by which the reamer 1 is inserted into, for example, a valve hole (a pilot hole formed on a workpiece) at the cylinder head of an engine, thereby cutting the inner wall face of the valve hole to form a bored hole with a predetermined inner diameter. Further, a cutting insert 50 disposed at the tip on the outer periphery of the tool main body 11 is used to cut a valve sheet face with which a valve head is to be in contact on an opening of the valve hole.

In performing the cutting process by using the reamer 1, coolant is supplied through a pipe from a machine tool to a coolant port 15 of the tool main body 11. The coolant supplied to the coolant port 15 is supplied to the edge part 3 through a coolant supplying port formed at the shank part 2 of the reamer 1, and ejected through a communicating port and an ejection port formed on the edge part 23 from the groove bottom part of the chip discharging groove 8 to the inner wall face of the pilot hole.

According to the reamer 1 of the present embodiment, the shank part 2 and the edge part 3 are both constituted with cemented carbide. Since these parts are approximately equal in coefficient of thermal expansion, that is, from 5.0 to 5.1× $10^{6}$/° C., they will not be greatly distorted on soldering. Thus, the reamer 1 will not be curved. Further, the reamer 1 can be secured for rigidity due to the fact that soldered parts are not decreased in strength resulting from thermal influences, thereby preventing turnout of the reamer when rotated at high speeds.

Further, since the shank part 2 and the edge part 3 are separately sintered and formed, a coolant supplying port of the shank part 2 and a communicating port of the edge part 3 are respectively made in a desired diameter. Then, coolant can be supplied via the coolant supplying port, the communicating port and the ejection port to the inner wall face of the pilot hole. For example, the cross section of the coolant supplying port at the shank part 2 is made larger than that of the communicating port at the edge part 3 or a total cross section of the ejection port, thus making it possible to eject the coolant from the ejection port at a high pressure.

Therefore, chips can be discharged without fail by the thus discharged coolant and also the cutting edge 9 formed at the edge part 3 reduces the cutting resistance on cutting into the inner wall face of the pilot hole, suppressing chatter of the reamer 1 to accurately form a bored hole, and also enabling an increase in the life of the reamer 1 by suppressing wear of the cutting edge 9.

Further, the edge part 3 is constituted with an ultra fine particle alloy having an average grain size of about 0.6 μm and a Rockwell hardness of 94.0 HRA, thus making it possible not only to prevent the cutting edge 9 formed at the edge part 3 from being worn early to increase the life of the reamer 1 but also to cut even a relatively hard workpiece.

Still further, since the shank part 2 is constituted with cemented carbide having an average grain size of about 1.0 μm and a Rockwell hardness of 91.0 HRA, it is possible to prevent deformation of the shank part 2 and the like and increase the life of the reamer 1.

In addition, the cemented carbide having a relatively large average grain size, which constitutes the above-described shank part 2, can be manufactured at a lower cost than the ultra fine particle alloy having a relatively small average grain size, which constitutes the edge part 3. Since a major part of the reamer 1 is constituted with the above-described shank part 2, it is possible to provide reasonably-priced boring tools. In other words, as described above, the edge part 3 and the shank part 2 are constituted with different types of cemented carbide, as with a case where they are molded by integrated sintering, thereby eliminating the necessity for constituting the shank part 2 with the same cemented carbide as that of the edge part 3 to manufacture the reamer 1 at a lower cost.

In the present embodiment, an angle, α, which is formed by two side wall faces of the V-shaped groove 7 of the shank part 2, is 90 degrees, and a raised part 6 fitted into the V-shaped groove 7 is installed at the edge part 3, thus making it possible to transfer the rotational torque of the shank part 2 to the edge part 3. Further, an area at which the shank part 2 is soldered to the edge part 3 can be secured to joint them firmly.

An explanation has been so far made for a reamer of an embodiment in the present invention. The present invention shall not be limited thereto and can be modified appropriately as long as it does not depart from the technical idea of the invention.

An explanation has been made for a reamer which is attached to the cutting tool given in FIG. 11, for example. The present invention shall not be limited thereto and may be a reamer attached to other cutting tools or adaptors.

An explanation has also been made for a case where the edge part is constituted with an ultra fine particle alloy. The edge part may be constituted with such cemented carbide that cobalt and the like used as a binder thereof are decreased in content or it may be constituted with other types of cemented carbide.

Further, an explanation has been made for a case where the reamer is provided with six rows of chip discharging grooves. There is no restriction on the number of the chip discharging grooves and the arrangement thereof, which are desirably determined, whenever necessary, with consideration given to the quality of a workpiece and the like.

Figure 12:
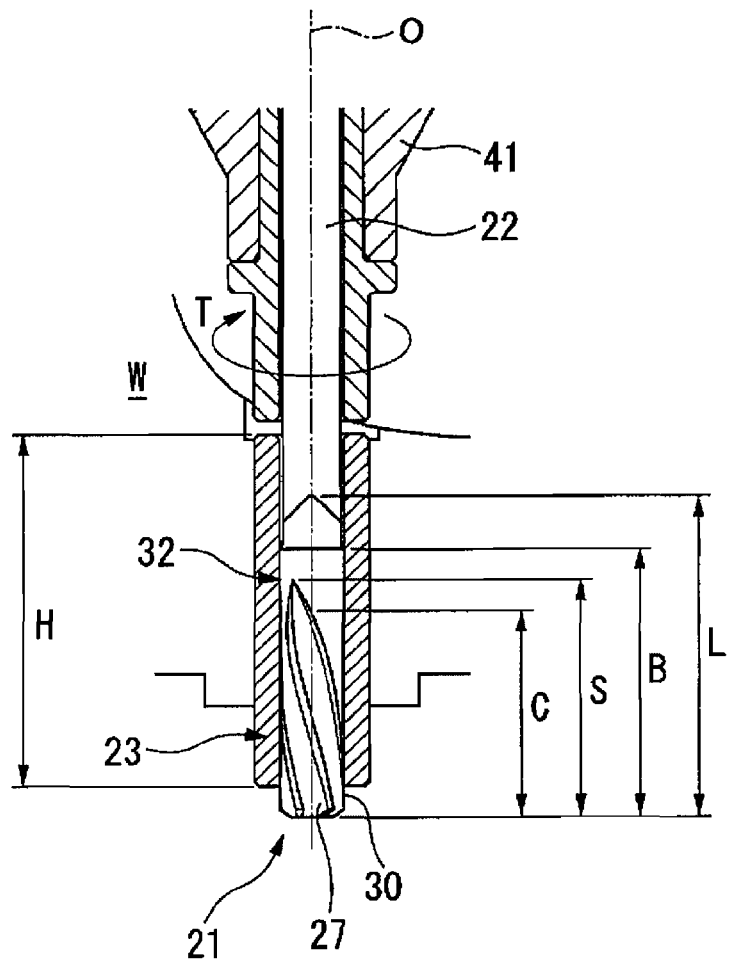
FIG. 12 is a view for explaining a method of boring a pilot hole in the present invention.
Figure 13:
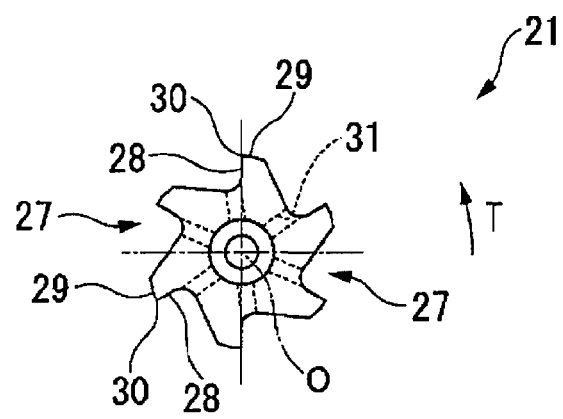
FIG. 13 is a front elevational view of the reamer of Embodiment 1 in the present invention, which is used in the method of boring given in FIG. 12.
Figure 14:
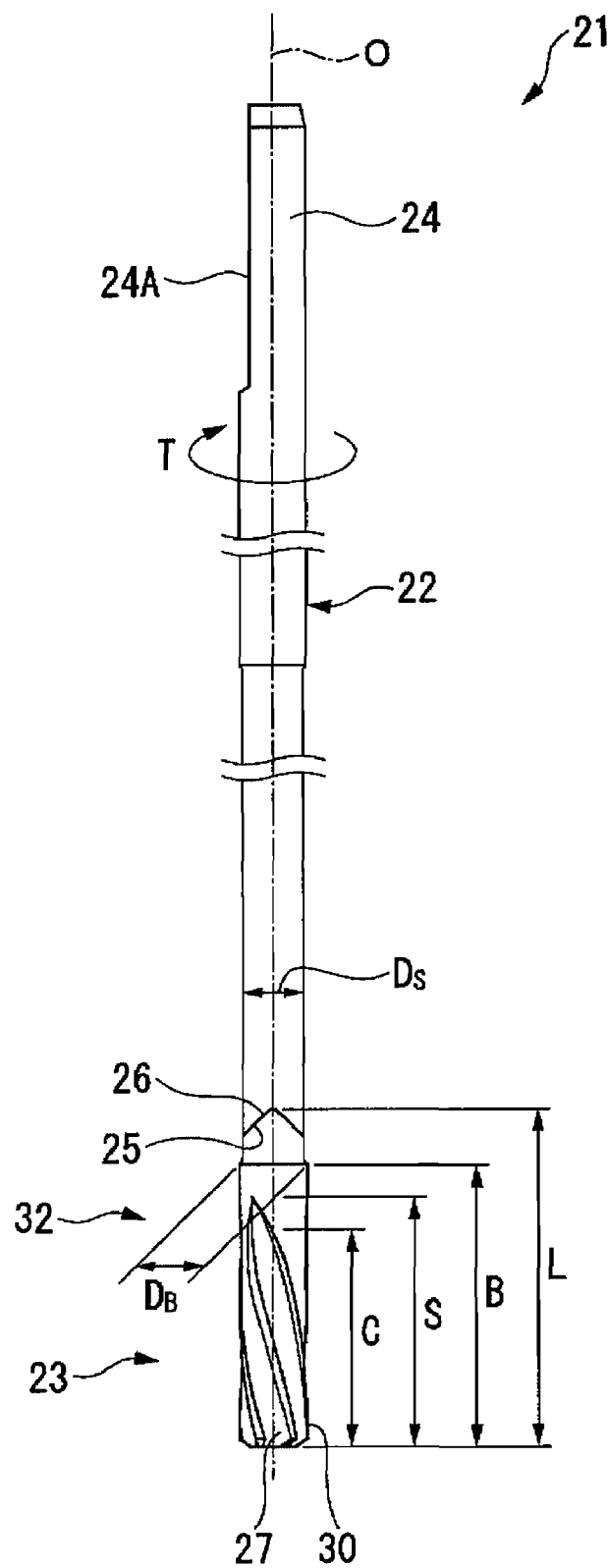
FIG. 14 is a side elevational view of the reamer given in FIG. 13.
Figure 15:
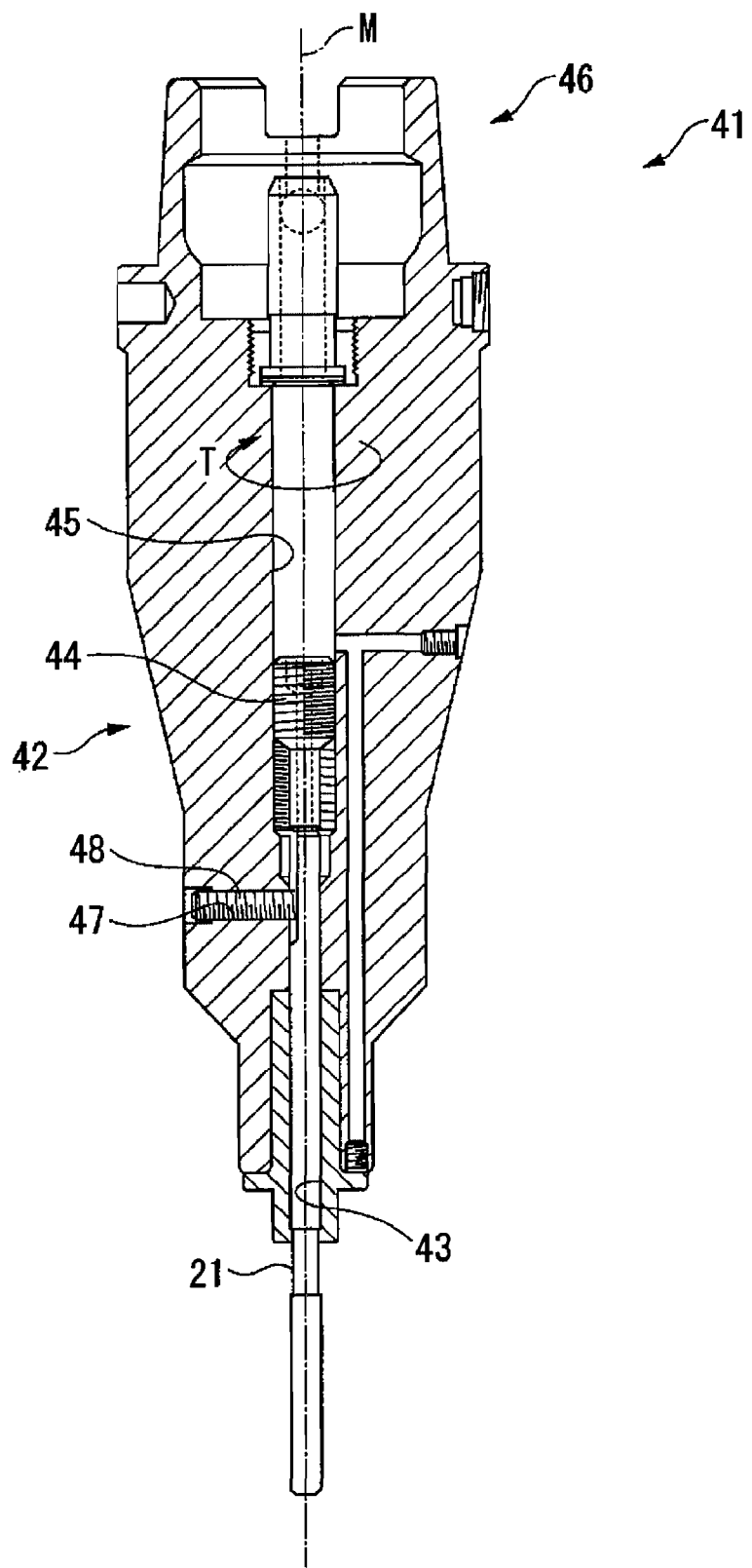
FIG. 15 is a partial cross sectional view of the side face of a cutting tool to which the reamer given in FIG. 13 is attached.

Hereinafter, an explanation will be made by referring to the attached drawings for a method of boring a pilot hole, which is an embodiment of the present invention, and a boring tool used in the method, which is Embodiment 1 of the present invention. FIG. 12 shows a method of boring a pilot hole, which is an embodiment of the present invention. FIG. 13 and FIG. 14 show a reamer as a boring tool used in the method of boring the pilot hole. Further, FIG. 15 shows a cutting tool to which the reamer is attached.

The reamer 21 is constituted with a long cylindrical shank part 22 and an edge part 23 arranged at the tip of the shank part (below in FIG. 14).

The shank part 22 is constituted with steel or the like and formed approximately in a multi-stage cylindrical shape. An attachment part 24 for attaching the reamer 21 to the cutting tool 41 is installed at the rear end side (above in FIG. 14). A flat face 24A extending parallel to the axis O is installed at the attachment part 24.

The tip of the shank part 22 is made smaller in outer diameter Ds by one step than the rear end side at which the attachment part 24 is installed. On the tip face of the shank part 22, there is formed a V-shaped groove 25 in which the central part is recessed to the rear end side of the shank part 22. An angle formed by the V-shaped groove 25 ranges from 60 degrees to 120 degrees. In the present embodiment, the angle is set to be 90 degrees.

Further, a coolant supplying port is formed at the shank part 22 so as to penetrate through the shank part 22 from the tip side to the rear end side, and opened at the center of the V-shaped groove 25.

The edge part 23 is formed approximately in a cylindrical shape and constituted with cemented carbide harder, for example, than the shank part 22. A raised part 26 formed on the tip face of the shank part 22 and fitted into the V-shaped groove 25 is formed at the rear end face thereof.

A plurality of chip discharging grooves 27 extending to the rear end side in the axis O direction and twisted at a predetermined twist angle (10 degrees in the present embodiment) forward in the tool rotating direction T are arranged at the tip on the outer periphery of the edge part 23 peripherally in rotational symmetry at equal intervals by a predetermined angle with respect to the axis O. As shown in FIG. 13, in the present embodiment, six rows of the chip discharging grooves 27 are arranged in rotational symmetry every 60 degrees with respect to the axis O.

A cutting edge 30 is formed at a crossed ridge part between the wall face 28 of the chip discharging groove 27 facing forward in the tool rotating direction T and the outer peripheral face 29 continuing to the back side of the tool rotating direction T.

The cutting edge 30 is formed as described above, by which the wall face 28 of the chip discharging groove 27 facing forward in the tool rotating direction T is provided as a cutting face and the outer peripheral face 29 continuing to the back side in the tool rotating direction T is provided as a relief face. Then, as with the chip discharging groove 27, the cutting edge 30 is formed helically so as to be twisted at a predetermined twist angle (10 degrees in the present embodiment) around the axis O forward in the tool rotating direction T, as it moves closer to the rear end side.

In this instance, a length of the chip discharging groove 27 in the axis O direction, S, is set to be shorter than a length of the edge part 23 constituted with cemented carbide in the axis O direction, L.

Further, as shown in FIG. 13, the cross section of the chip discharging groove 27 is formed in a V-shape, and an angle formed by the V-shape is to be approximately 80 degrees. The wall face 28 facing forward in the tool rotating direction T, which is provided as a cutting face, is formed so as to extend radially approximately along a circle formed by the outer cross section of the edge part 23. Further, the edge part 23 is provided with a communicating port (not illustrated) extending along the axis O and opened at the raised part 26. It is also provided with an ejection port 31 extending from the communicating port to each of the chip discharging grooves 27 and opened at the groove bottom part thereof.

Further, a back tapered part 32, which reduces in diameter as it moves from the tip side to the rear end side, is formed at the edge part 23. A length of the back tapered part 32 in the axis O direction, B, is set to be shorter than a length of the chip discharging groove 27 in the axis O direction, S. In other words, the length of the back tapered part 32, B, the length of the chip discharging groove 27, S, and the length of the edge part 23, L, are related to be L>B>S. Still further, regarding the cutting edge 30 formed at a crossed ridge part between the wall face 28 of the chip discharging groove 27 facing forward in the tool rotating direction T and the outer peripheral face 29, the length thereof in the axis O direction, C, is made shorter than the length of the chip discharging groove 27, S, with consideration given to the discontinuation on the rear end side of the chip discharging groove 27.

Still further, the outer diameter Db of the rear end at the back tapered part 32 is set to be larger by 0.02 mm or more than the outer diameter Ds of the tip at the shank part 22. In the present embodiment, it is set to be larger by 0.02 mm. Here, in the present embodiment where a length of the back tapered part 32, B, is set to be shorter than a length of the edge part 23, L, a part of the edge part 23 constituted with cemented carbide is also elongated at the rear end side from the back tapered part 32, and the part is further reduced in diameter via a step from the rear end of the back tapered part 32, thereby made equal to the outer diameter Ds of the shank part 22. Therefore, the step is to be 0.01 mm or more (00.01 mm in the present embodiment).

The reamer 21 is used on attachment to the cutting tool 41 given in FIG. 15. The cutting tool 41 is provided with a multi-stage cylindrical tool main body 42 rotated around the axis M.

An attachment port 43 extending along the axis M is drilled on the tip face of the tool main body 42. A coolant port 45 is provided into which a position adjusting bolt 44 is inserted so as to be communicatively connected to the rear end side of the attachment port 43. The coolant port 45 is opened at a fixing part 46 installed at the rear end side of the tool main body 42.

A threaded hole 47 opened on the side face of the tool main body 42 and communicatively connected to the attachment port 43 is also formed, and a clamp screw 48 is screwed into the threaded hole 47.

The reamer 21 is inserted into an attachment port 43 drilled on the tip face of the tool main body 42 and arranged in such a manner that the rear end face of the shank part 22 is brought into contact with the tip face of the position adjusting bolt 44, the flat face 24A of the shank part 22 faces a direction at which the threaded hole 47 of the tool main body 42 is installed and also the axis O of the reamer 21 coincides with the axis M of the tool main body 42. Then, the clamp screw 48 screwed into the threaded hole 47 of the tool main body 42 is screwed thereinto to press the flat face 24A, by which the reamer 21 is fixed to the tool main body 42.

The cutting tool 41 to which the reamer 21 is attached as described above is mounted at the main shaft end of the machine tool via a fixing part 46, rotated around the axis M (axis O), after being adjusted for the position with respect to the reamer 21 in the axis M direction, and carried toward the tip of the axis M (axis O). The reamer 21 is inserted into a pilot hole (for example, a stem guide hole or the like) formed on a workpiece W, cutting the inner wall face of the pilot hole, thereby forming a bored hole having a predetermined inner diameter.

In performing the cutting process by using the reamer 21, coolant is supplied through a pipe from a machine tool to a coolant port 45 of the tool main body 42. The coolant supplied to the coolant port 45 is supplied to the edge part 23 through a coolant supplying port formed at the shank part 22 of the reamer 21, and ejected through a communicating port and an ejection port 31 formed at the edge part 23 from the groove bottom part of the chip discharging groove 27 to the inner wall face of the pilot hole.

Chips generated on cutting the inner wall face of the pilot hole are guided toward the tip of the reamer 21, because the chip discharging groove 27 is formed so as to be twisted forward in the tool rotating direction T. Further, coolant is ejected through the coolant supplying port and the communicating port from the ejection port 31, by which the chips are discharged to the leading end of the reamer 21 in such a manner as to be flowed by the coolant.

In the method of boring a pilot hole in the present embodiment, a reamer 21 is used in which a length of the edge part 23, L, is shorter than a length of the pilot hole, H. Therefore, in the reamer 21 used here, the length of the cutting edge 30 formed on the outer periphery of the edge part 23 in the axis O direction, C, is shorter than the length of the pilot hole, H. As shown in FIG. 12, when the boring process by using the reamer 21 is completed, the edge part 23 is positioned at the lower part of a bored hole and a part of the shank part 22 is arranged at the upper part thereof.

The above-described reamer 21 is used, by which the edge part 23 slides in contact with the inner wall face of the bored hole at a smaller area, thus making it possible to suppress the cutting resistance. Further, since the edge part 23 at which the chip discharging groove 27, the ejection port 31 and the like are formed is short in length, L, the reamer 21 is secured for the rigidity, thereby preventing breakage thereof due to cutting resistance. Still further, the reamer 21, which is improved in rigidity, is capable of suppressing turnout and chatter thereof when rotated at high speeds and accurately forming a bored hole.

In addition, since a back tapered part 32 is formed at the edge part 23 of the reamer 21, the tip of the reamer 21 is greatest in outer diameter and the rear end side is smallest in outer diameter, by which the reamer 21 can be inserted into the bored hole to secure the cutting process.

Further, since a length of the back tapered part 32, B, is made shorter than the length of the edge part 23, L, the rear end side of the edge part 23 is not excessively small in outer diameter to secure rigidity of the reamer 21.

Further, since a length of the chip discharging groove 27 in the axis O direction, S, is made shorter than the length of the back tapered part 32 in the axis O direction, B, the edge part 23 is notched at a smaller part to further improve rigidity of the reamer 21.

Still further, since the outer diameter of the shank part 22, Ds, is made smaller by 0.02 mm than the outer diameter of the rear end side at the back tapered part 32, Db, the shank part 22 is spaced away from the inner wall face of a bored hole, for which there is no concern that the inner wall face of the bored hole could be damaged, and the reamer 21 is prevented from an increase in rotational torque.

Figure 16:
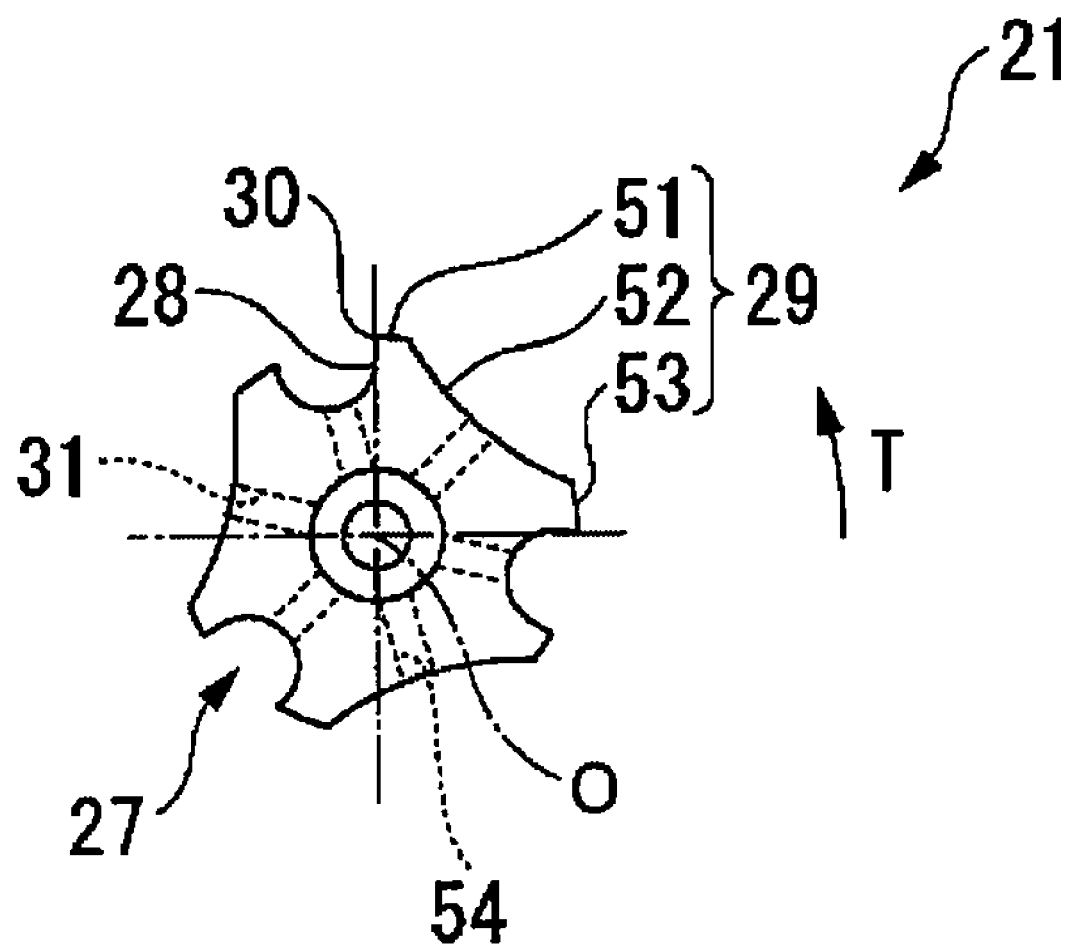
FIG. 16 is a front elevational view of the reamer of Embodiment 2 in the present invention, which is used in the method given in FIG. 12.
Figure 17:
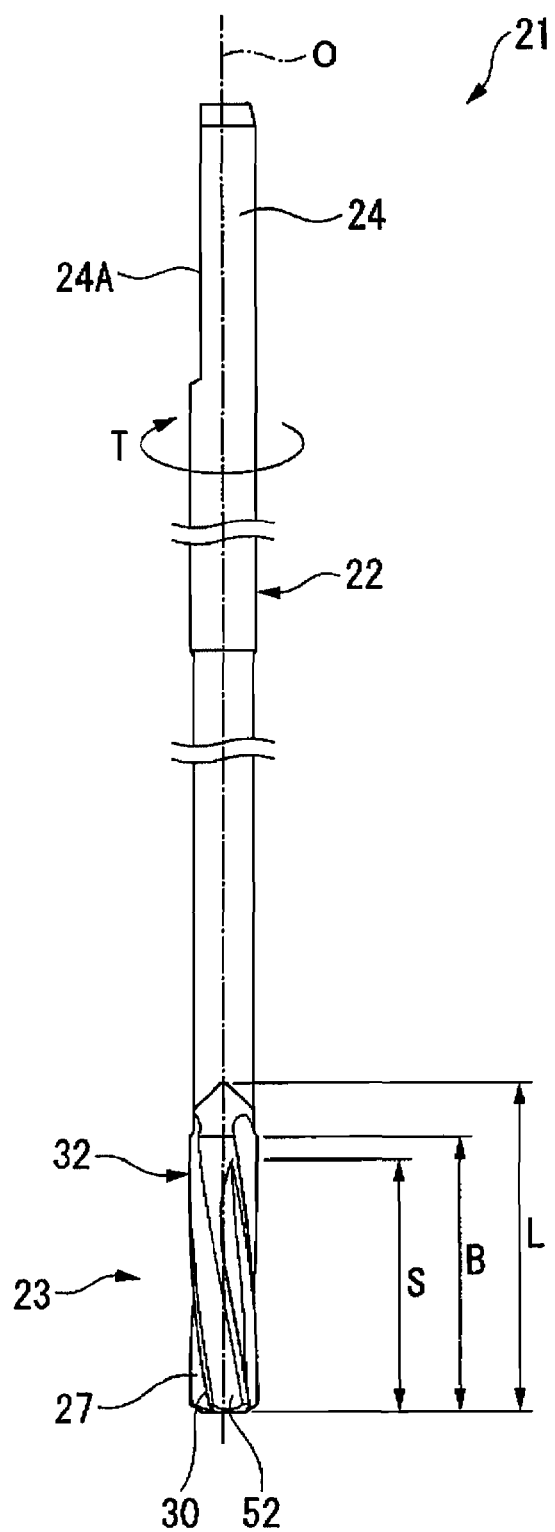
FIG. 17 is a side elevational view of the reamer given in FIG. 16.

Next, an explanation will be made for a boring tool of Embodiment 2 in the present invention by referring to the attached drawings. FIG. 16 and FIG. 17 show the reamer of Embodiment 2 in the present invention as a boring tool. In addition, the same members as those of Embodiment 1 are given the same reference numerals, the explanation of which will be omitted here.

As shown in FIG. 16, in Embodiment 2, the chip discharging groove 27 has a U-shaped cross section, and the wall face 28 facing forward in the tool rotating direction T and provided as a cutting face is formed so as to extend radially approximately along a circle formed by the outer cross section of the edge part 23. As shown in FIG. 16, in the present embodiment, three rows of chip discharging grooves 27 are arranged in rotational symmetry every 120 degrees with respect to the axis O.

The outer peripheral face 29 continuing to the cutting edge 30 and provided as a relief face is provided with a first land part 51 formed so as to continue to the cutting edge 30, a relief part 52 continuing to the back side of the first land part 51 in the tool rotating direction T and retracted radially inwardly and a second land part 53 formed so as to continue to the back side of the relief part 52 in the tool rotating direction T. The first land part 51 and the second land part 53 are formed in a circular arc so as to be equal in radius at the center of the axis O. Further, the relief part 52 is formed on a cross section vertical to the axis O in such a manner as to give an R-shape groove which is raised radially inwardly in a radius greater than that of the groove bottom having a V-shaped cross section formed by the chip discharging groove 27, wider than the chip discharging groove 27 and deeper in the groove. The relief part 52 is elongated up to the tip of the shank part 22, riding over the rear end of the back tapered part 32.

Further, the edge part 23 is provided with a communicating port (not illustrated) extending along the axis O and opened at the raised part 26, an ejection port 31 extending from the communicating port to each of the chip discharging grooves 27 and opened at the groove bottom part thereof and a discharge port 54 extending to each of the relief parts 52 and opened at an R-shape groove bottom part formed by the relief parts 52.

Further, in the reamer 21 of Embodiment 2, the chip discharging groove 27 is formed so as to have a U-shaped cross section but not widely opened radially outwardly and smaller in a notched part, by which the reamer 21 is further improved in rigidity. Therefore, it is possible to prevent turnout of the reamer 21 when rotated at high speeds and accurately form a bored hole. It is also possible to suppress breakage of the reamer 21 due to cutting resistance and increase the life thereof.

Further, since the chip discharging groove 27 is made small in the cross section, coolant passes through the chip discharging groove 27 at a greater speed on ejection of the coolant from an ejection port 31 opened at the groove bottom part of the chip discharging groove 27, thus making it possible to discharge chips generated by the cutting edge 30 toward the tip of the reamer 21 without fail. Therefore, since there is no chance that the chips pass through the chip discharging groove 27, the chips can be discharged without fail even when the chip discharging groove 27 is made small in the cross sectional area, thereby the reamer 21 is used to effect a smooth boring.

Further, since the relief part 52 is formed on the outer peripheral face 29, which is provided as a relief face, a part sliding on the inner wall face of a bored hole can be adjusted, thereby reducing the cutting resistance of the reamer 21. Still further, the first land part 51 and the second land part 53 are formed, by which the bored hole is slidingly in contact with the first and the second land parts 51, 53 to make smooth the inner wall face of the bored hole. In addition, these first and second land parts 51, 53 serve as a guide, thereby rotating the reamer 21 stably to accurately form a bored hole.

Coolant is supplied not only from the ejection port 31 opened at the groove bottom part of the chip discharging groove 27 but also from the discharge port 54 opened at the R-shaped groove bottom part formed by the relief part 52, thereby chips can be discharged by the coolant without fail.

An explanation has been made so far for the method of boring a pilot hole and the reamer 21, which is an embodiment of the present invention. The present invention shall not be limited thereto and may be modified in any way as long as it does not depart from the technical idea of the invention.

In the invention, for example, the reamer 21 given in FIG. 14 has been explained as that which is attached to the cutting tool 41, but may include that which is used on attachment to other cutting tools or adaptors.

Figure 18:
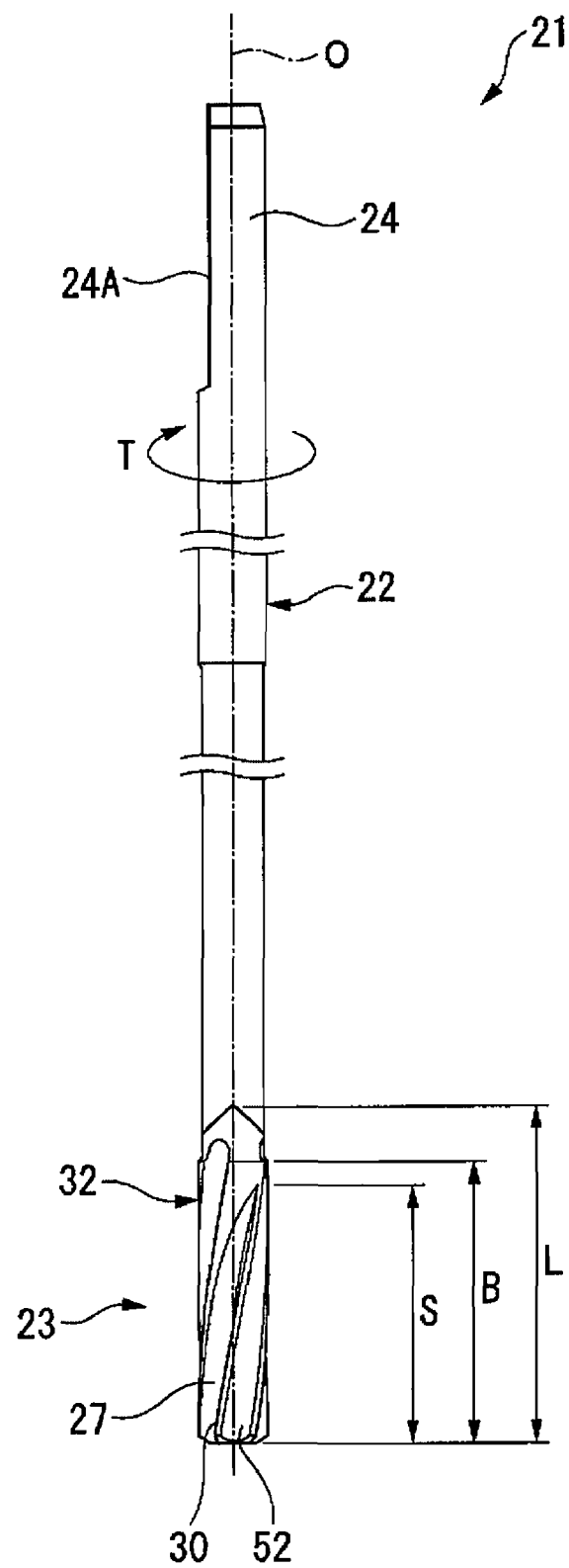
FIG. 18 is a side elevational view of a reamer of another embodiment in the present invention.
Figure 19:
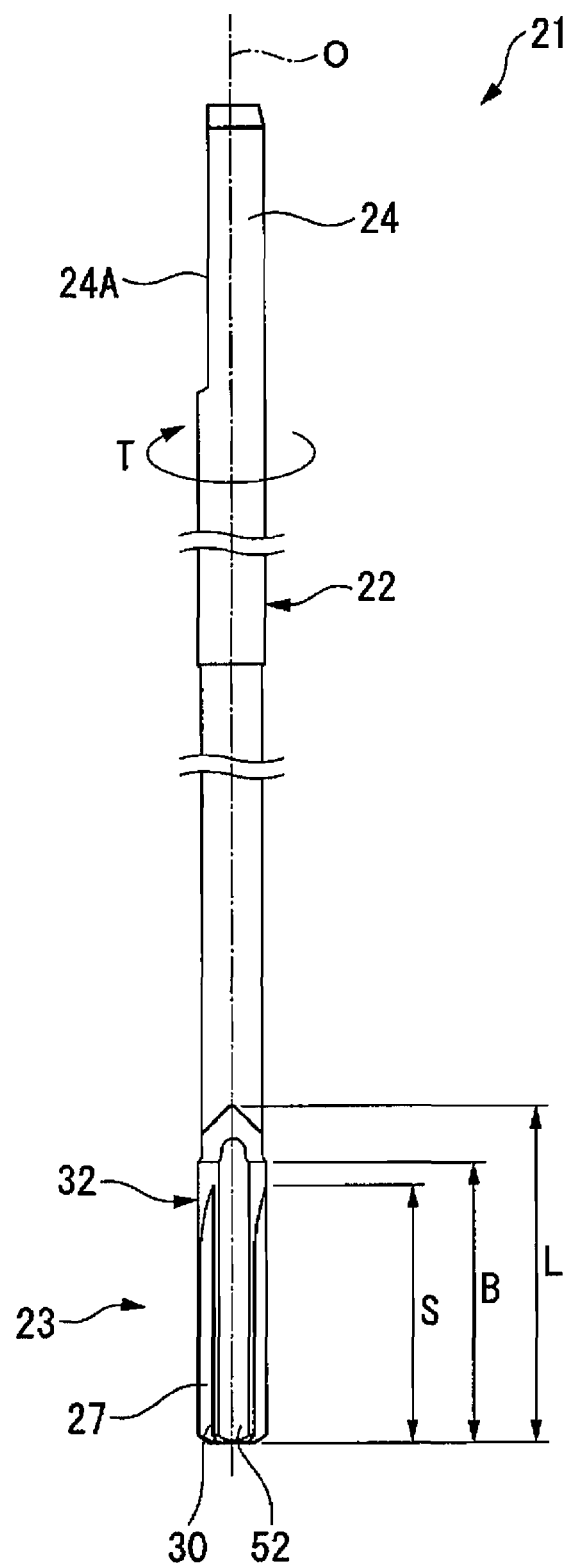
FIG. 19 is a side elevational view of the reamer of another embodiment in the present invention.
Figure 20:
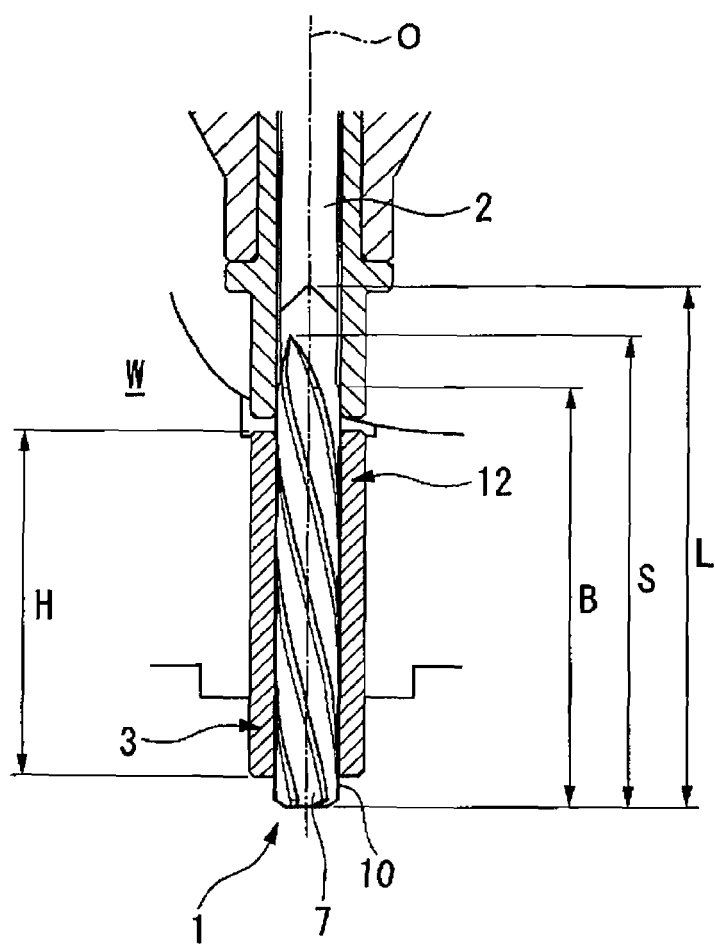
FIG. 20 is a view for explaining a conventional method of boring a pilot hole.
Figure 21:
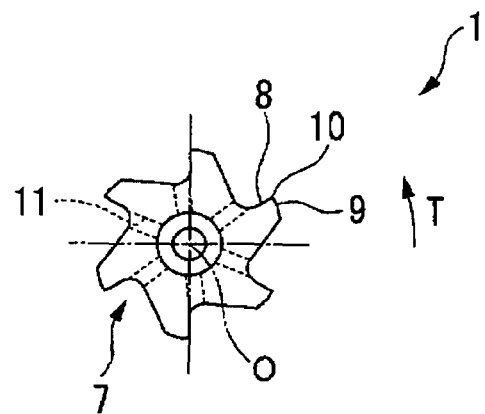
FIG. 21 is a front elevational view of a conventional reamer.
Figure 22:
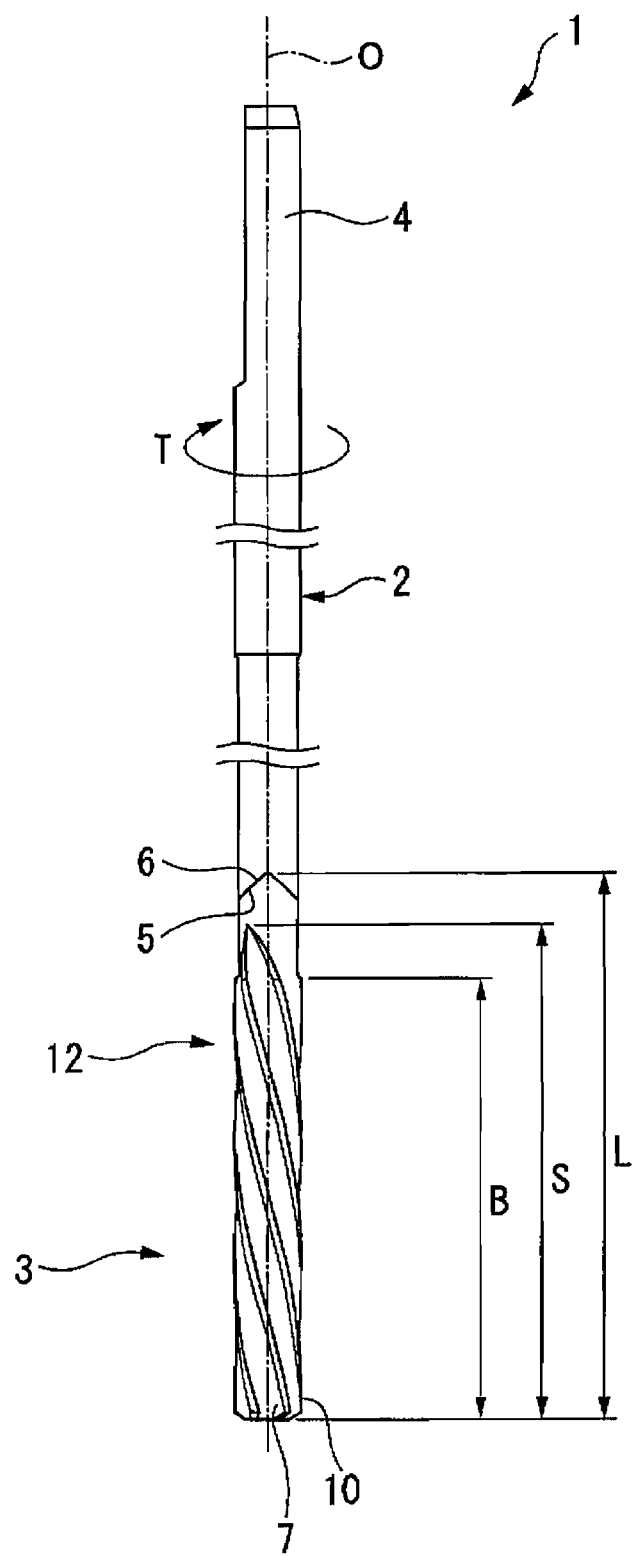
FIG. 22 is a side elevational view of the reamer given in FIG. 21.

Further, the chip discharging groove 27 has been explained as that which is twisted forward in the tool rotating direction T as it moves to the rear end side of the reamer 21. However, the present invention shall not be limited thereto and includes, for example, the chip discharging groove 27 given in FIG. 18, which is formed so as to be twisted to the back side in the tool rotating direction T and that given in FIG. 19, which is formed linearly so as not to be twisted.

Where the chip discharging groove 27 is formed as shown in FIG. 18 and FIG. 19, chips generated by the cutting edge 30 are not guided so as to move to the tip of the reamer 21, and coolant is allowed to flow through the chip discharging groove 27 to the tip of the reamer 21 at a greater speed, by which the chips can be discharged to the tip of the reamer 21.

INDUSTRIAL APPLICABILITY

According to the method of boring a pilot hole, since a boring tool having a cutting edge shorter in length than the pilot hole formed on a workpiece is used to effect the cutting process, the cutting edge or chip discharging grooves are not made unnecessarily long and the boring tool can be secured for rigidity. Therefore, it is possible to accurately form a bored hole by suppressing turnout of the boring tool. Further, the boring tool is slidingly in contact with the bored hole at a smaller area to result in a reduced cutting resistance, thereby preventing breakage of the boring tool due to cutting resistance.

Further, such a boring tool is used that the edge part is constituted with a material harder than the shank part and a length of the edge part in the axis direction is shorter than a length of the pilot hole, by which a length of the cutting edge can be made reliably shorter than the pilot hole and the cutting edge formed on the edge part can be improved in wear resistance to increase the life thereof.

As a boring tool used in the method of boring a pilot hole, preferably used is that which is provided with a shank part rotated around an axis and an edge part arranged at the tip of the shank part, in which a chip discharging groove extending from the tip side to the rear end side is formed at the edge part, a cutting edge is formed at a crossed ridge part between the wall face of the chip discharging groove facing forward in the tool rotating direction and the outer peripheral face of the edge part, a back tapered part is formed so as to gradually reduce in outer diameter from the tip face of the edge part to the rear end side, a length of the back tapered part in the axis direction is made shorter than a length of the edge part in the axis direction. This is because the rear end side of the edge part is not excessively small in outer diameter and secured for rigidity of the boring tool.

Further, the back tapered part is formed, by which the rear end side of the edge part is not slidingly in contact with the inner wall face of a bored hole formed by the cutting edge installed on the outer periphery at the tip of the edge part, thus making it possible to smoothly cut the bored hole.

Further, a length of the chip discharging groove formed on the boring tool in the axis direction is made shorter than a length of the back tapered part in the axis direction, by which the edge part 23 can be notched at a smaller part to further improve rigidity of the boring tool.

Still further, the tip of the shank part is made smaller by 0.02 mm or more in outer diameter than the rear end side at the back tapered part, by which the shank part is spaced away from the inner wall face of a bored hole and there is no concern that the inner wall face of the bored hole could be damaged due to the contact therewith, and the reamer is prevented from an increase in rotational torque. In addition, the edge part can be reliably inserted into a pilot hole even if the edge part is shorter than the pilot hole, by which the boring tool is used to cut the pilot hole without any problems.

Further, the cross section of the chip discharging groove vertical to the axis is formed in a U-shape, that is, in such a manner that the wall face of the chip discharging groove facing forward in the tool rotating direction is approximately parallel to the wall face facing backward in the tool rotating direction on the cross section via the groove bottom formed in a recessed circular arc shape. In this instance, where such a boring tool is formed that is equal in depth of the chip discharging groove of the previously described conventional reamer, the cross section of which is a V-shape, and also equal in radius of a recessed circular arc formed by the groove bottom, the boring tool is notched at a smaller part to secure rigidity thereof. As a result, the boring tool is not only able to prevent turnout thereof when rotated at high speeds and accurately form a bored hole but also able to increase the life by suppressing breakage thereof due to cutting resistance.

Further, the chip discharging groove is made smaller in cross sectional area, and where coolant is ejected from an ejection port opened at the groove bottom part of the chip discharging groove, the coolant passes through the chip discharging groove at a greater speed. It is, therefore, possible to discharge chips generated by the cutting edge, for example, to the tip of the boring tool, without fail. As a result, the chips are discharged to the tip as described above, thereby no chips are clogged in the chip discharging groove even if the chip discharging groove is made smaller in the cross sectional area, and the boring tool can be used to effect a smooth cutting process.

Still further, the outer peripheral face is provided with a first land part formed so as to continue to the cutting edge, a relief part continuing to the back side of the first land in the tool rotating direction and retracted radially inwardly, and a second land part formed so as to continue to the back side of the relief part in the tool rotating direction, thereby making it possible to decrease a part slidingly in contact with a bored hole and also decrease the cutting resistance on the cutting process by using the boring tool. Still further, the first land part and the second land part are formed, by which the bored hole is slidingly in contact with the first and the second land parts to bore the inner wall face of a bored hole smoothly. The first and the second land parts also serve as a guide, thereby the boring tool can be stably rotated to accurately form the bored hole.

In addition, the relief part is provided with a discharge port for discharging coolant, and the discharge port is arranged at the rear end side, which is more than ⅔ a length of the edge part from the tip of the edge part in the axis direction. Thereby, coolant is supplied from the relief part to the tip of the edge part at a greater speed, by which sliding friction by the first and the second land parts is reduced to lower the cutting resistance and also chips generated by the cutting edge can be more reliably discharged to the tip of the edge part.

According to the present invention, it is possible to provide a method of boring a pilot hole in which a boring tool is secured for rigidity to prevent turnout of the boring tool when rotated at high speeds, thereby accurately forming the bored hole and the cutting resistance is reduced to prevent breakage of the boring tool, and also to provide a boring tool appropriate for the method.

Further, in the thus constituted boring tool, the shank part and the edge part are both made of cemented carbide. These parts are approximately equal in the coefficient of thermal expansion and not greatly distorted on soldering, thus making it possible to prevent the boring tool from being curved. Soldered parts are not decreased in strength resulting from thermal influences on soldering, by which the boring tool is secured for rigidity to suppress turnout of the boring tool when rotated at high speeds and accurately form a bored hole.

Still further, the shank part is molded separately from the edge part, by which a coolant supplying port of the shank part and a communicating port of the edge part can be opened at a desired diameter. Thus, coolant can be supplied to a workpiece reliably via the coolant supplying port and the communicating port.

In addition, the edge part and the shank part may be made of a different type of cemented carbide, depending on the respective uses.

For example, the edge part is constituted with cemented carbide harder than that constituting the shank part, thus making it possible to cut a relatively hard workpiece and also to increase the life of the boring tool. Further, the shank part is constituted with an ordinary type of cemented carbide to manufacture the boring tool at a lower cost.

It is known that an ultra fine particle alloy smaller in particle size than tungsten carbide powder, which is a basic material of cemented carbide, and cemented carbide in which a binder (cobalt or the like) is used at a reduced quantity are improved in hardness. They can be used as those constituting the edge part.

As described above, according to the present invention, it is possible to provide a boring tool equipped with an edge part constituted with cemented carbide depending on the hardness of a workpiece and having a sufficient rigidity, in which coolant can be reliably supplied to a workpiece to accurately and efficiently cut the workpiece. The boring tool can also be manufactured at a lower cost.

The invention claimed is:

1. A boring tool comprising an edge part having a cutting edge at the tip of a shank part,
   wherein the edge part is constituted with cemented carbide and is jointed by solder at the tip of the shank part, which shank part is also constituted with cemented carbide, and
   wherein an average grain size of a material which makes up the cemented carbide constituting the shank part is bigger than an average grain size of a material which makes up the cemented carbide constituting the edge part.

2. The boring tool according to claim 1,
   wherein the edge part is constituted with cemented carbide harder than the cemented carbide constituting the shank part.

3. The boring tool according to claim 1, wherein the shank part and the edge part have a substantially identical coefficient of thermal expansion.

* * * * *